US009765993B2

(12) United States Patent
Gandy

(10) Patent No.: US 9,765,993 B2
(45) Date of Patent: Sep. 19, 2017

(54) GEOTHERMAL ENERGY BATTERY AND EXCHANGER SYSTEM

(76) Inventor: Daniel M. Gandy, Statesville, NC (US)

(*) Notice: Subject to any disclaimer, the term of this patent is extended or adjusted under 35 U.S.C. 154(b) by 789 days.

(21) Appl. No.: 13/695,950

(22) PCT Filed: May 3, 2011

(86) PCT No.: PCT/US2011/035031
§ 371 (c)(1),
(2), (4) Date: Jan. 17, 2013

(87) PCT Pub. No.: WO2011/140112
PCT Pub. Date: Nov. 10, 2011

(65) Prior Publication Data
US 2013/0104545 A1 May 2, 2013

Related U.S. Application Data

(60) Provisional application No. 61/343,724, filed on May 3, 2010.

(51) Int. Cl.
F24J 3/08 (2006.01)
F28D 17/02 (2006.01)
F24D 11/02 (2006.01)
F24F 5/00 (2006.01)
(Continued)

(52) U.S. Cl.
CPC ............. F24J 3/08 (2013.01); F24D 11/0214 (2013.01); F24F 5/0007 (2013.01); F24J 3/081 (2013.01);
(Continued)

(58) Field of Classification Search
CPC .......... F01K 25/08; F03B 13/142; F03G 7/04; F24F 5/0046; F24J 3/081; F24J 3/083;
(Continued)

(56) References Cited

U.S. PATENT DOCUMENTS 3,630,276 A * 12/1971 Paine ...................... F22B 1/023
122/32
4,375,831 A 3/1983 Downing, Jr.
(Continued)

FOREIGN PATENT DOCUMENTS

JP 2007147171 A * 6/2007
KR 10-0202429 B1 6/1999

OTHER PUBLICATIONS

International Preliminary Report on Patentability dated Nov. 6, 2012 for International Application No. PCT/US2011/035031.
(Continued)

Primary Examiner — Mark Laurenzi
Assistant Examiner — Mickey France
(74) Attorney, Agent, or Firm — Moore & Van Allen PLLC; Jeffrey R. Gray

(57) ABSTRACT

Embodiments of the invention utilize the geothermal energy exchanger and battery (GEEB) to recover and store thermal energy from the dwelling, from the ground, and from the Earth's atmosphere, reuse the thermal energy in another season of the year, and consume electrical energy to heat and cool the structure at electrical Off Peak time periods. The GEEB may be constructed of a compact steel, ribbed and waterproof permanent container that is set at a depth beneath the surface of the ground where the normal soil temperature is virtually constant year round. The container can then be encased in poured concrete, with the exception of piping or conduits. The container is then filled with a heat transfer fluid so that the entire thermal mass of the GEEB and heat transfer fluid reaches the ambient ground temperature and efficiently couples the load and source sides of a heating and cooling system.

20 Claims, 19 Drawing Sheets

(51) Int. Cl.
*F28D 20/00* (2006.01)
*F28F 3/02* (2006.01)
*F28F 13/06* (2006.01)

(52) U.S. Cl.
CPC ......... *F28D 17/02* (2013.01); *F28D 20/0052* (2013.01); *F28F 3/02* (2013.01); *F28F 13/06* (2013.01); *F24D 2200/11* (2013.01); *F24D 2200/12* (2013.01); *F24F 5/0017* (2013.01); *Y02B 10/40* (2013.01); *Y02B 30/126* (2013.01); *Y02E 10/12* (2013.01); *Y02E 60/142* (2013.01); *Y02E 70/30* (2013.01)

(58) Field of Classification Search
CPC . F24J 3/085; F25B 30/06; F25B 39/04; F25D 1/02; F28D 1/02; F28D 7/12; F28D 7/106; F28D 20/025; F28D 1/06; F28D 2021/0084; Y02E 10/10; Y02E 10/12; Y02E 10/14; Y02E 10/28; Y02E 10/32; Y02E 10/38; Y02E 10/72; Y02E 10/125; Y02E 60/142; Y02E 70/30; F28B 1/00; F28B 1/02
USPC .............. 60/398, 641.2; 62/160, 238.7, 260; 165/45, 48.1, 142, 110; 237/2 B
See application file for complete search history.

(56) References Cited

U.S. PATENT DOCUMENTS

| | | | | | |
|---|---|---|---|---|---|
| 4,546,825 | A | * | 10/1985 | Melnyk | F28F 9/00 165/159 |
| 5,291,943 | A | * | 3/1994 | Dhir | F28D 3/04 138/38 |
| 2007/0029066 | A1 | * | 2/2007 | Kidwell et al. | 165/45 |
| 2008/0047685 | A1 | * | 2/2008 | Kim | F02M 26/32 165/52 |
| 2008/0314064 | A1 | * | 12/2008 | Al-Eidan | F25B 13/00 62/324.6 |
| 2009/0165992 | A1 | | 7/2009 | Song | |
| 2009/0277602 | A1 | * | 11/2009 | Yang | F24F 5/0046 165/45 |

OTHER PUBLICATIONS

International Search Report and Written Opinion dated Dec. 22, 2011 for International Application No. PCT/US2011/035031.
Written Opinion and Corrected International Search Report dated Dec. 22, 2011 for International Application No. PCT/US2011/035031.

\* cited by examiner

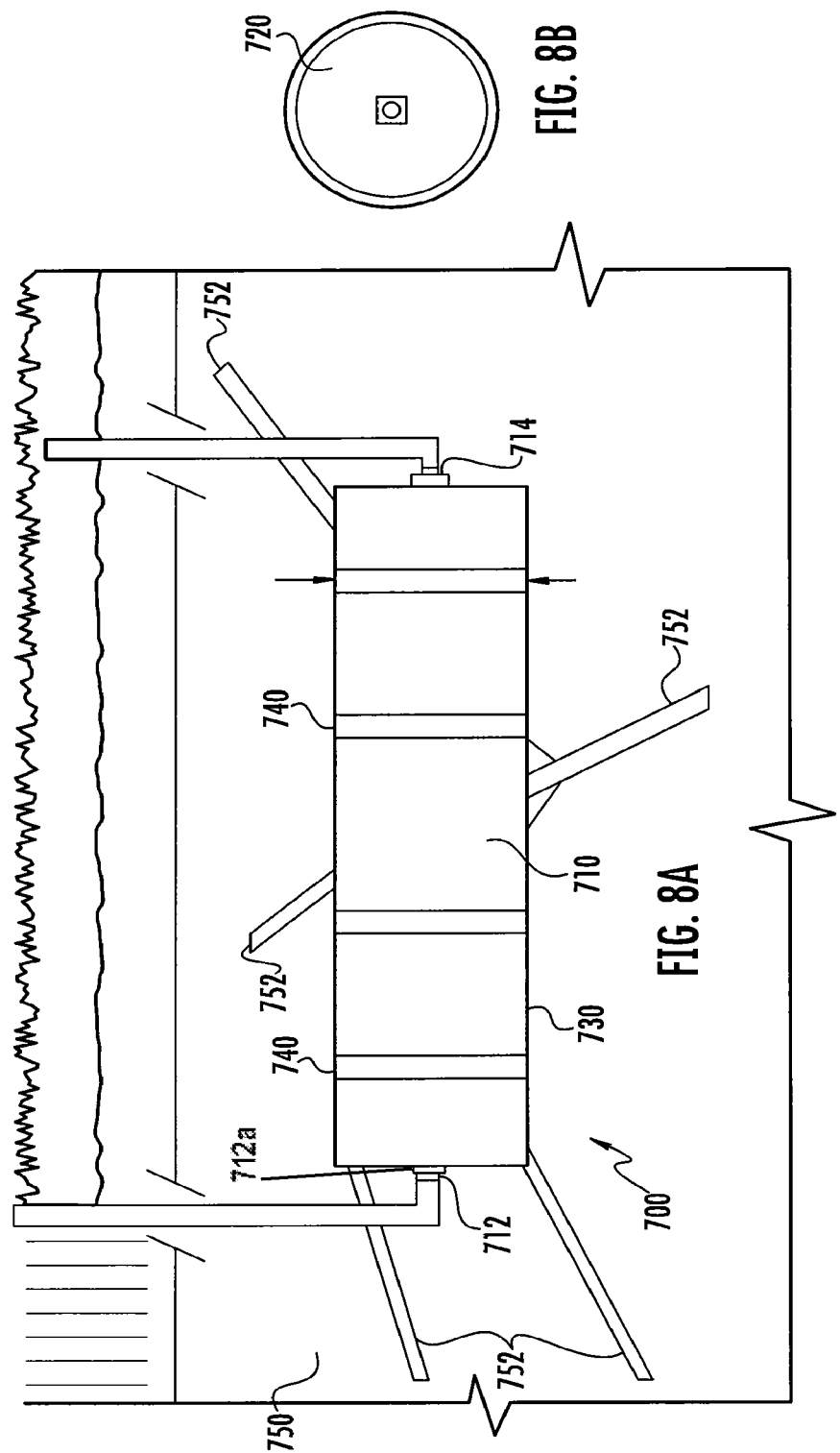

GEOTHERMAL ENERGY BATTERY AND EXCHANGER SYSTEM

CLAIM OF PRIORITY UNDER 35 U.S.C. §119

The present application for a patent claims priority to Provisional Application No. 61/343,724 entitled "Geothermal Energy Battery and Exchanger System and Method for Heating and Cooling" filed May 3, 2010 and hereby expressly incorporated by reference herein.

FIELD

The present invention relates generally to residential heating and cooling systems, and more particularly to a system that utilizes the natural and renewable thermal mass effect of concrete or similar substance in an occupied structure, such as a commercial or residential dwelling, to gather, store, and release thermal energy from the earth (hereinafter referred to as "geothermal energy"), the earths atmosphere, and the dwelling structure itself, to heat and cool the structure and generate domestic hot water.

BACKGROUND

Modern residential construction commonly utilizes insulation materials that are light weight with high thermal resistance (R-values) and thermal transmittance (U-factors) but do not take into account the advantageous uses of heavier, dense thermal mass such as concrete. Thermal mass in the most general sense is any material that has the capacity to store thermal energy or heat. When used correctly, thermal mass can significantly delay the requirements for electric heating and air conditioning systems in a structure or residential dwelling to a different time periods, such as when electric utility rates are lower.

In much of the USA, On Peak and Off Peak hours are determined by the local electric utility and typically are different for summer and winter months. In summer months On Peak hours are typically from 1:00 pm-7:00 pm Monday through Friday. In winter months On Peak hours are typically 7:00 am-12:00 noon Monday through Friday. At all other times, or Off Peak, electrical utility rates are as much as 70% lower than On Peak rates. Shifting the time at which a home owner is using electricity, results in substantial electric utility cost savings to the home owner. Additionally, shifting peak electrical loads can reduce the number of power plants required, since power plants are designed to provide power at peak loads, and thus reduce the resultant pollution of the atmosphere.

With buildings, heat flow is referred to in a number of different ways. The most common reference is "R-value," or resistance to heat flow. The higher the R-value of a material, the better it is at resisting heat loss or heat gain. U-factor, or "U-value" as it is often called, is a measure of the flow of heat-thermal transmittance through a material, given a difference in temperature on either side. The U-factor is the number of British Thermal Units ("BTU") of energy passing through a square foot of the material in an hour for every degree Fahrenheit difference in temperature across the material (Btu/ft²hr° F.). Materials that are very good at resisting the flow of heat (high R-value, low U-factor) can serve as good insulation materials. The R-value and U-factor are the inverse of one another: U=1/R.

Materials have another property called heat capacity that can affect their thermal energy performance in certain situations. Heat capacity is a measure of how much heat a material can hold. The property is most significant with heavy, high-thermal-mass materials such as concrete. Concrete is an ideal material for thermal mass as this material has high specific heat, high density, and low thermal conductivity.

Thermal Mass represents and reflects the ability of a material, or a combination of materials, to store thermal energy. This property is characterized by the mass of the material and its specific heat. The thermal mass is described with the following equation:

$$Q = c \cdot m \frac{dT}{dt}$$

Where
Q=Heat flow
c=Specific heat of mass material
m=Mass
T=Temperature
t=Time

Materials with low thermal conductivity are able to slowly gather and store heat, and then slowly release heat. Materials with high thermal mass can gather and release relatively large quantities of heat per unit volume compared to other materials.

Thermal mass should not be confused with insulation. Materials used for insulation typically have much lower thermal conductivity than materials used for thermal mass and generally do not have a high capacity to store heat. They can reduce unwanted heat transfer but are not significant sources of heat, or heat storage, in themselves.

In the typical and historical application of thermal mass in a residential dwelling, the walls and floors are constructed of concrete. The concrete is heated by the sun during the day, which stores the heat and releases it at night for heating the interior structure. Conversely, as the concrete floors and walls cool down at night, they help to keep the structure cool the next day. This approach to thermal mass, or thermal mass effect, has limitations that have restricted its use. For example, high-mass walls can significantly outperform low-mass walls of comparable steady-state R-value, i.e. they can achieve a higher "mass-enhanced R-value." However, this mass-enhanced R-value is only significant when the daily outdoor temperatures cycle above and below indoor temperatures within a 24-hour period. Thus, high-mass walls and floors are most beneficial to moderate climates that have high daily temperature swings above and below the desired indoor temperature setpoint, such as in areas like New Mexico.

Therefore, there is a need to design heating and cooling systems that can more efficiently utilize thermal mass and geothermal energy as an alternate heating and cooling source for a dwelling, such as a commercial or residential structure.

BRIEF SUMMARY

Embodiments of the present invention address the above needs and/or achieve other advantages by providing apparatuses (e.g., a system and/or other device), methods, or a combination of the foregoing for a geothermal battery and heat exchanger that utilizes geothermal energy for seasonal and off peak heating and cooling of a dwelling.

Embodiments of the invention utilize the geothermal battery and heat exchanger to recover and store thermal energy from the dwelling, from the ground, and from the Earth's atmosphere, reuse the thermal energy in another season of the year or time of day, and consume electrical energy to heat and cool the structure at electrical Off Peak time periods. By utilizing thermal mass to shift thermal loads to Off Peak time periods of the day (diurnal thermal storage), and by recovering and reusing thermal energy consumed and paid for to heat and cool the dwelling in one season of the year (seasonal thermal storage) and re-using that thermal energy in the thermally opposite season of the year, the total electrical energy used, and the On Peak electrical energy required to heat and cool the structure on an annual basis are reduced by adding a geothermal battery and heat exchanger to a conventional low mass building envelope.

In the present invention, thermal mass effect and geothermal heat pumps are utilized to heat and cool a dwelling. One embodiment of the invention is a Geothermal Energy Exchanger And Battery (GEEB) that is buried in the ground at least four feet below the surface. The GEEB may work in combination with a water source, or geothermal heat pump, heating and cooling system having in some embodiments a modular high mass externally insulated indoor thermal mass storage tank, an electrically powered water-to-water source heat pump with refrigerant de-superheater, an air handling apparatus including a blower and motor and one or more water/air coils made from copper tube-aluminum fin or like material, an insulated domestic hot water storage tank with indirect heat exchanger coil, and all interconnecting heat exchange fluid piping, valves, pumps and temperature/operating controls.

The total system consumes most of its energy at Off Peak times (time periods of lowest electric utility grid demand) to gather, generate and store thermal energy for use during On Peak times (time periods of highest electric utility grid demand), thereby substantially reducing the electrical KW/H unit cost. Also, energy used to provide heating and cooling in the dwelling is also recovered and stored via thermal mass effect for full usage in another thermally opposite season of the year, thereby significantly reducing the total electrical energy KW/H usage required to produce heating, air conditioning and domestic hot water for the structure on an annual basis.

In the present invention the GEEB provides a combination of geothermal heat pumps and high thermal mass effect to achieve an optimum thermal energy storage, exchange and consumption solution. In one embodiment of the invention, the GEEB is constructed of steel because of its structural and conductive properties, and concrete because of the thermal mass properties of concrete and its efficient thermal coupling and/or contact beween the dwelling thermal load and the thermal source (i.e. the earth) when the container is buried in the ground and backfilled with concrete. However, any material with similar properties to steep and concrete can be used. Steel and concrete are chosen for not only their desirable properties in these embodiments but also because they readily available and cheep.

In one embodiment of the invention, the GEEB may be constructed of a compact steel, ribbed and waterproof permanent concrete mold or form (i.e. a tank or container) that is set at a depth beneath the surface of the ground where the normal soil temperature is virtually constant year round. For example, temperatures of the ground at a depth of 6 feet in many areas of the United States and Canada are approximately 55 degrees Fahrenheit. The tank, including structural reinforcement, can then be fully encased in poured concrete, with the exception of a vertical chase for steel, copper or HDPE entrance and exit piping or conduits at the inlet and outlet ends of the apparatus (other types of piping and/or chases may be used in other embodiments). When the concrete has cured the GEEB may be back filled with soil. The resultant void left in the tank is then filled with a heat transfer fluid (i.e. water, or other liquid), so that the entire thermal mass of the heat exchanger and heat transfer fluid reaches the ambient ground temperature and efficiently couples the load and source sides of a heating and cooling system. The GEEB may be used to heat or cool the house using Off Peak energy rates on a day to day basis, and/or as a seasonal energy exchanger.

One embodiment of the invention is a geothermal energy exchanger and battery apparatus comprising a container and a thermal mass. The container can hold heat transfer fluid and comprises at least one input and at least on output to receive and provide the heat transfer fluid to and from a temperature control system. The container also has a plurality of protuberances on the surface of the container. The thermal mass incases at least a portion of the container. The geothermal energy exchanger and battery apparatus is at least partially buried in the ground and operatively coupled to the temperature control system for controlling the temperature of a dwelling by utilizing the heat transfer properties of the heat transfer fluid.

In further accord with an embodiment of the invention, the container further comprises a baffle, wherein the baffle increases the turbulence of the heat transfer fluid in the container. In another embodiment of the invention, the baffle comprises diffuser holes to allow the heat transfer fluid to pass through the baffle and increase the turbulence of the heat transfer fluid.

In yet another embodiment of the invention, the container further comprises a baffle, wherein the baffle has baffle protrusions that operatively mate with the protuberances in the surface of the container, and baffle protrusion free locations that increase the turbulence of the heat transfer fluid in the container.

In still another embodiment of the invention, the container further comprises a baffle, wherein the baffle increases structural support of the container.

In further accord with an embodiment of the invention, the container further comprises mass heat transfer elements, wherein the mass heat transfer elements are at least partially encased in the thermal mass and improve the heat transfer between the thermal mass and the container.

In another embodiment of the invention, the container further comprises container heat transfer elements, wherein the container heat transfer elements are inside of the container an improve the heat transfer between the container and the heat transfer fluid.

In yet another embodiment of the invention, the container is comprised of two or more sections that can be operatively coupled to one another to form the container; and wherein the two or more sections can be stacked for ease of storage and transport.

In still another embodiment of the invention, the container is made from steel for its structural strength and conductive properties. In further accord with an embodiment of the invention, the thermal mass is concrete for its high specific heat, high density, and low thermal conductivity.

Another embodiment of the invention is a geothermal energy exchanger and battery apparatus comprising a container, a plurality of protuberances located in a surface of the container, a thermal mass at least partially surrounding the container, and wherein the geothermal energy exchanger and battery apparatus is at least partially buried in the ground and operatively coupled to a temperature control system for regulating the temperature of a structure utilizing heat transfer fluid.

In further accord with an embodiment of the invention, the container further comprises a baffle, wherein the baffle increases the turbulence of the heat transfer fluid in the container, and provides structural support to the container.

In another embodiment of the invention, the container further comprises structural supports at least partially cover the container, and wherein the structural supports increase the structural security of the container.

In yet another embodiment of the invention, the structural supports also act as mass heat transfer elements, and increase the heat transfer between the thermal mass and the container, and thus between the container and the heat transfer fluid.

In still another embodiment of the invention, two or more containers are utilized to provide the necessary capacity for controlling the temperature of the structure.

Another embodiment of the invention is a geothermal energy exchanger and battery apparatus comprising a container, a plurality of protuberances located in a surface of the container, a baffle located inside of the container, and wherein the geothermal energy exchanger and battery apparatus is at least partially buried in the ground and operatively coupled to a temperature control system for regulating the temperature of a structure utilizing heat transfer fluid.

In further accord with an embodiment of the invention, the heat transfer fluid is water. In another embodiment of the invention, the container is made from steel.

In yet another embodiment of the invention, the geothermal energy exchanger and battery apparatus further comprise a thermal mass at least partially surrounding the container. In still another embodiment of the invention, the thermal mass is made from concrete.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
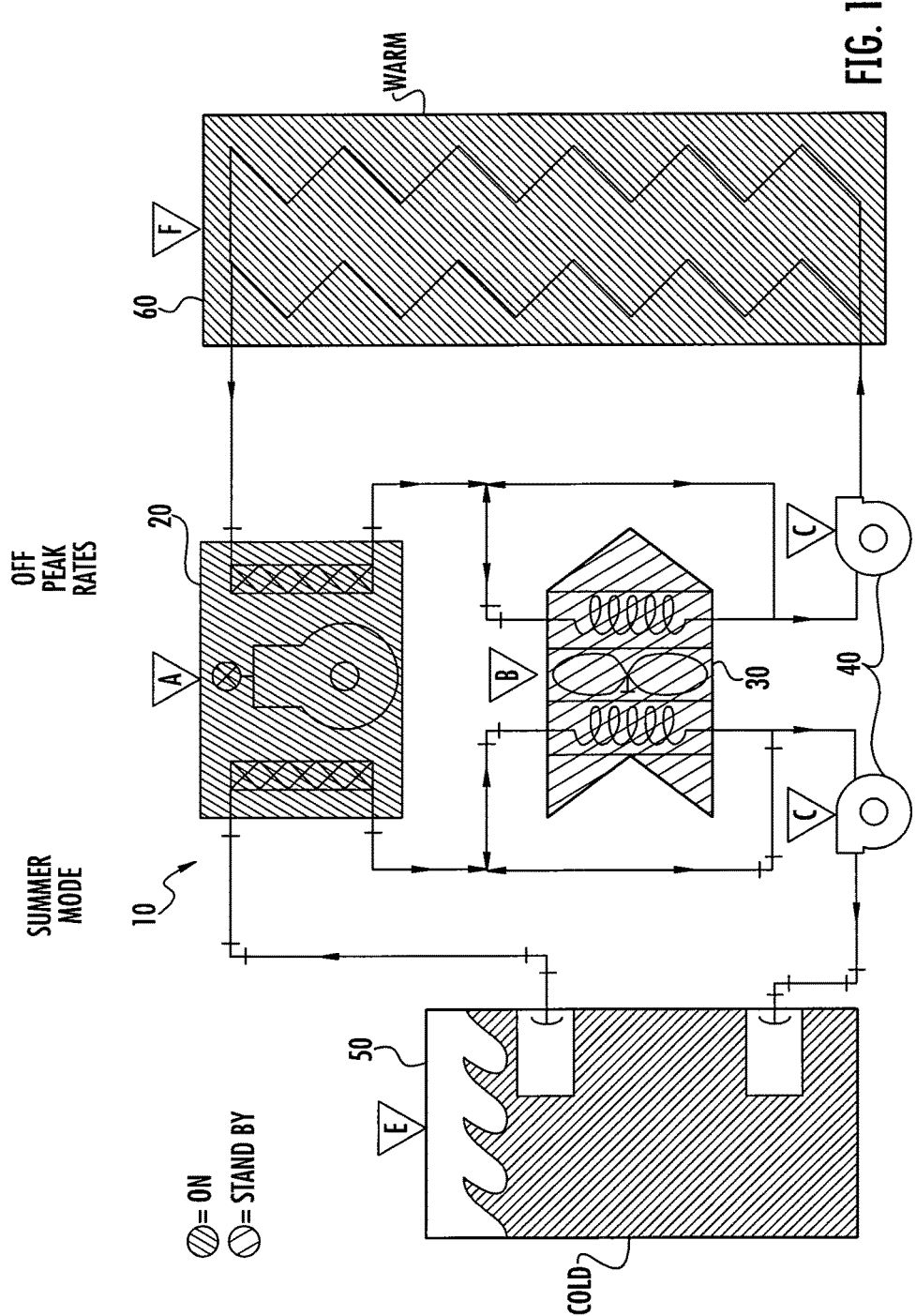
Figure 2:
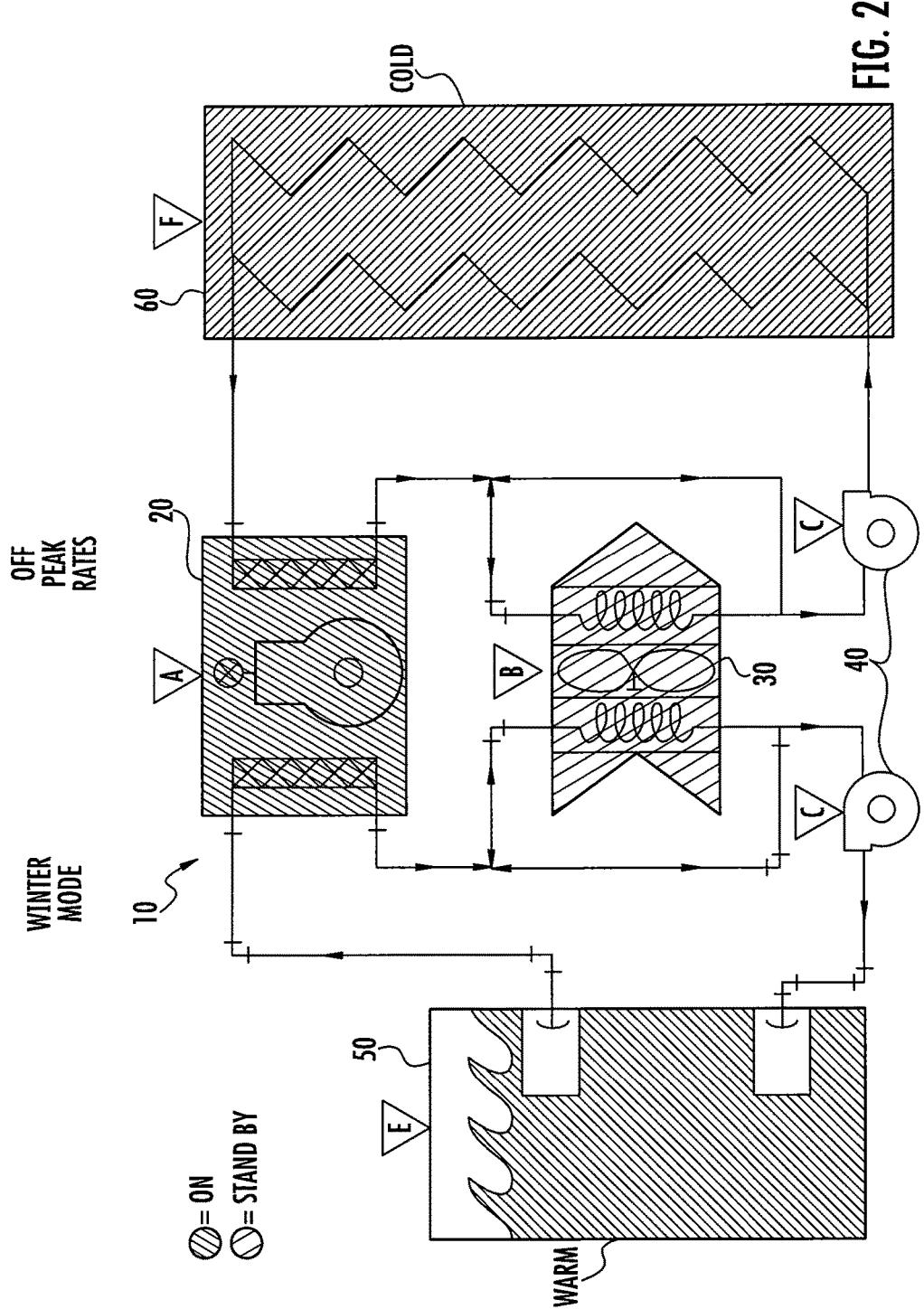
Figure 3:
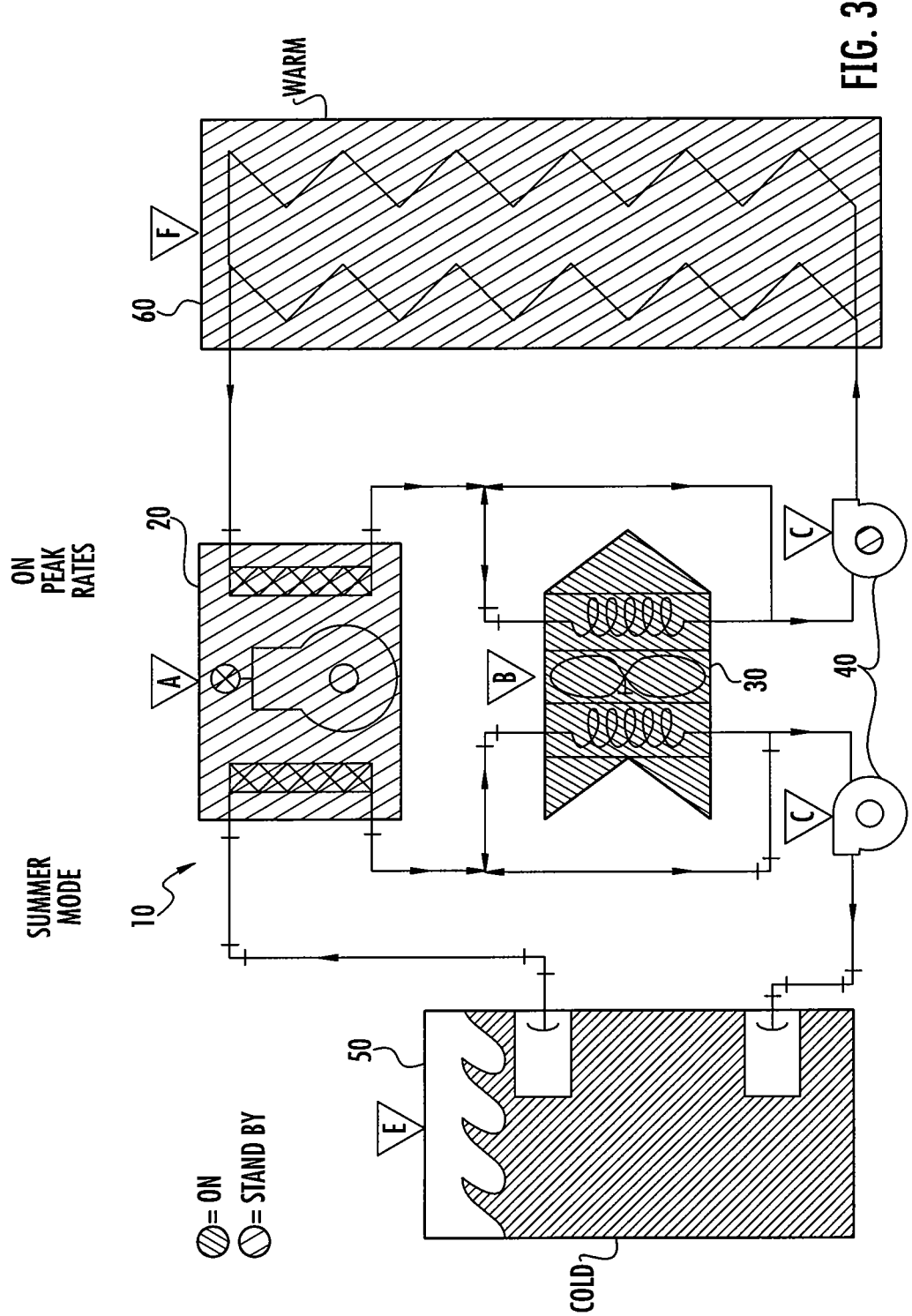
Figure 4:
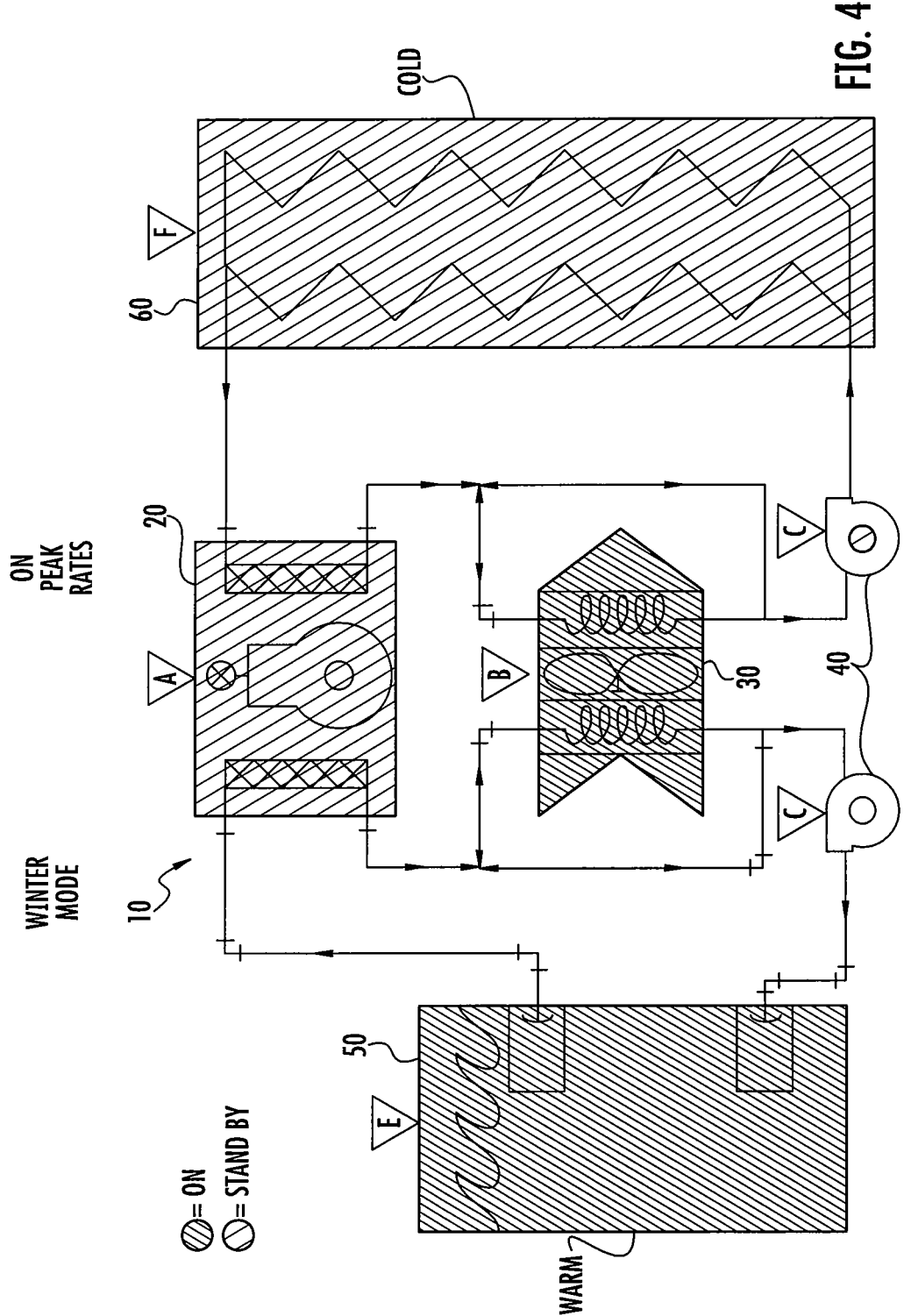
Figure 5:
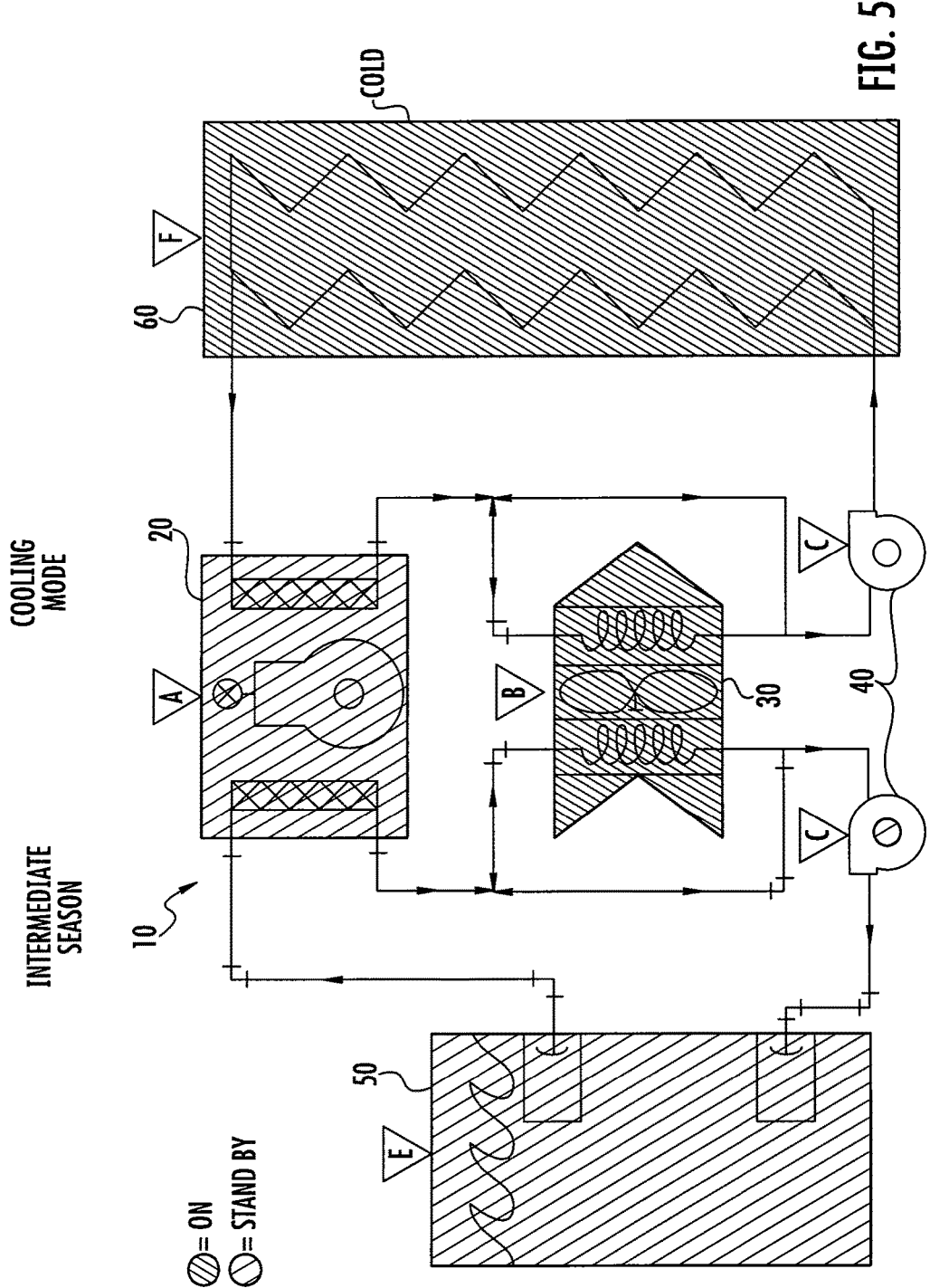
Figure 6:
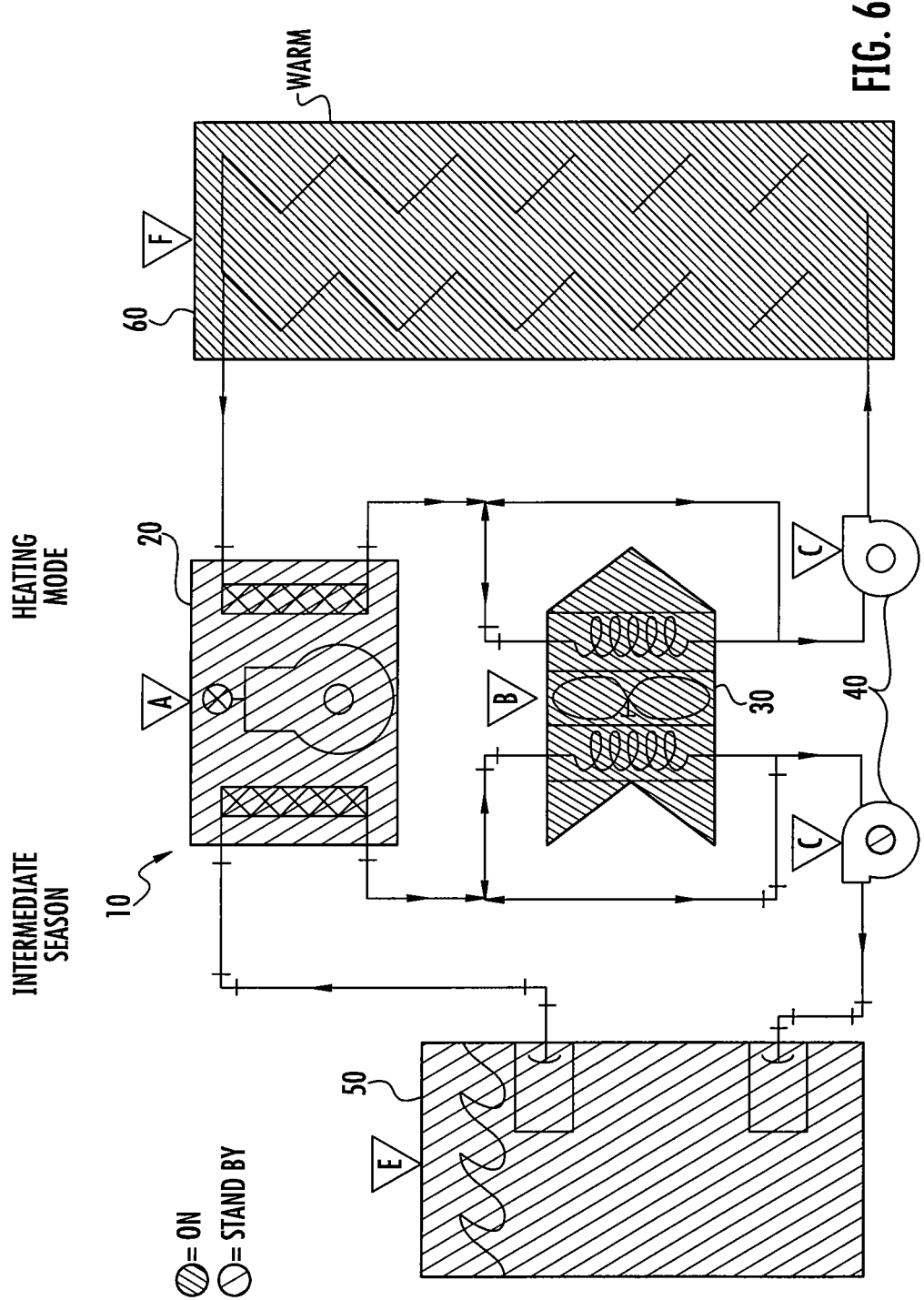
Figure 7:
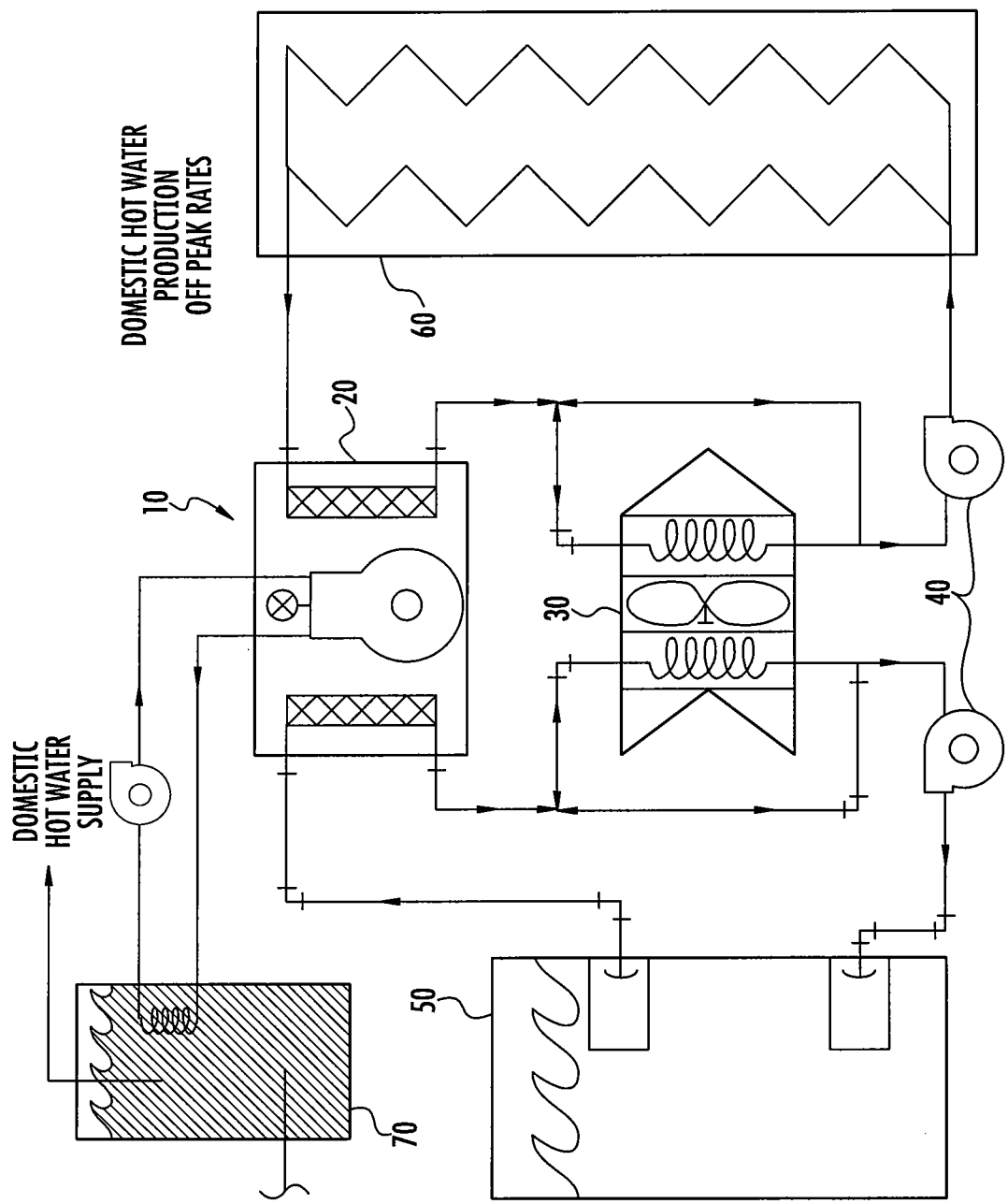
Figure 9A:
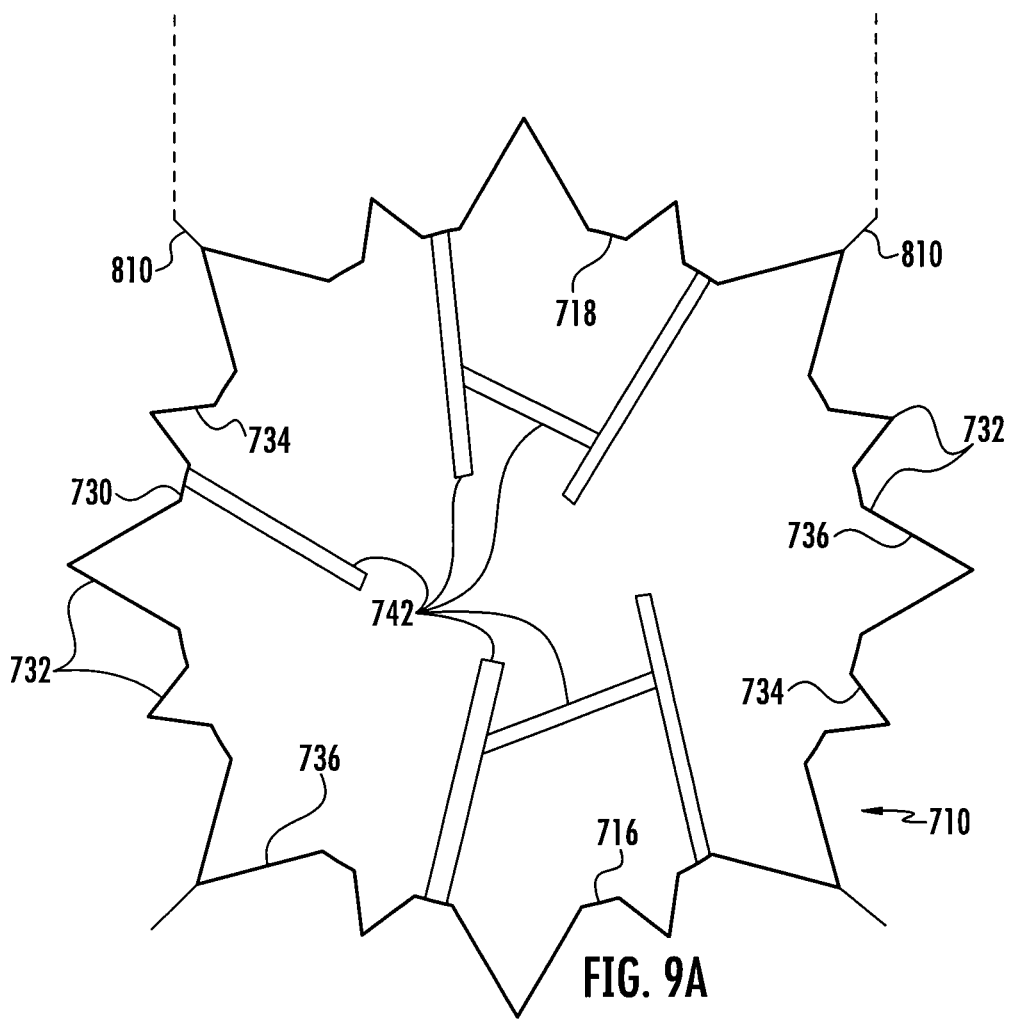
Figure 9B:
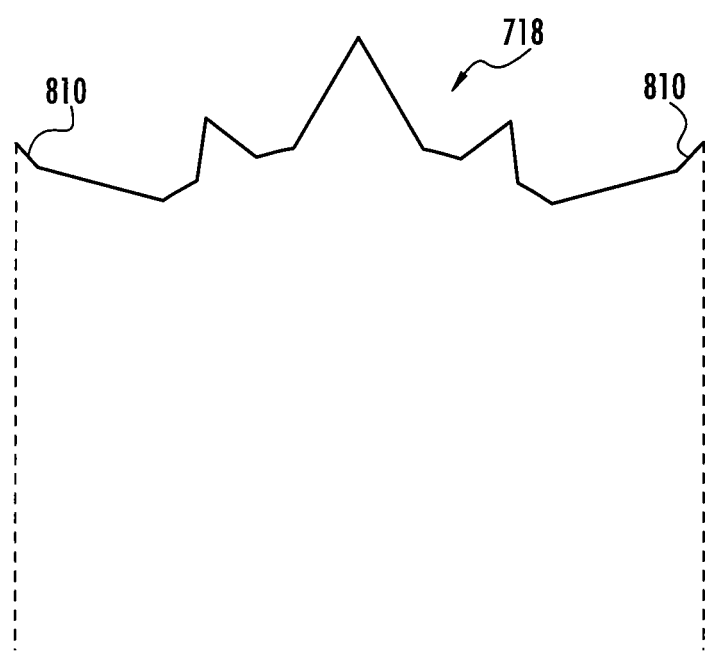
Figure 10A:
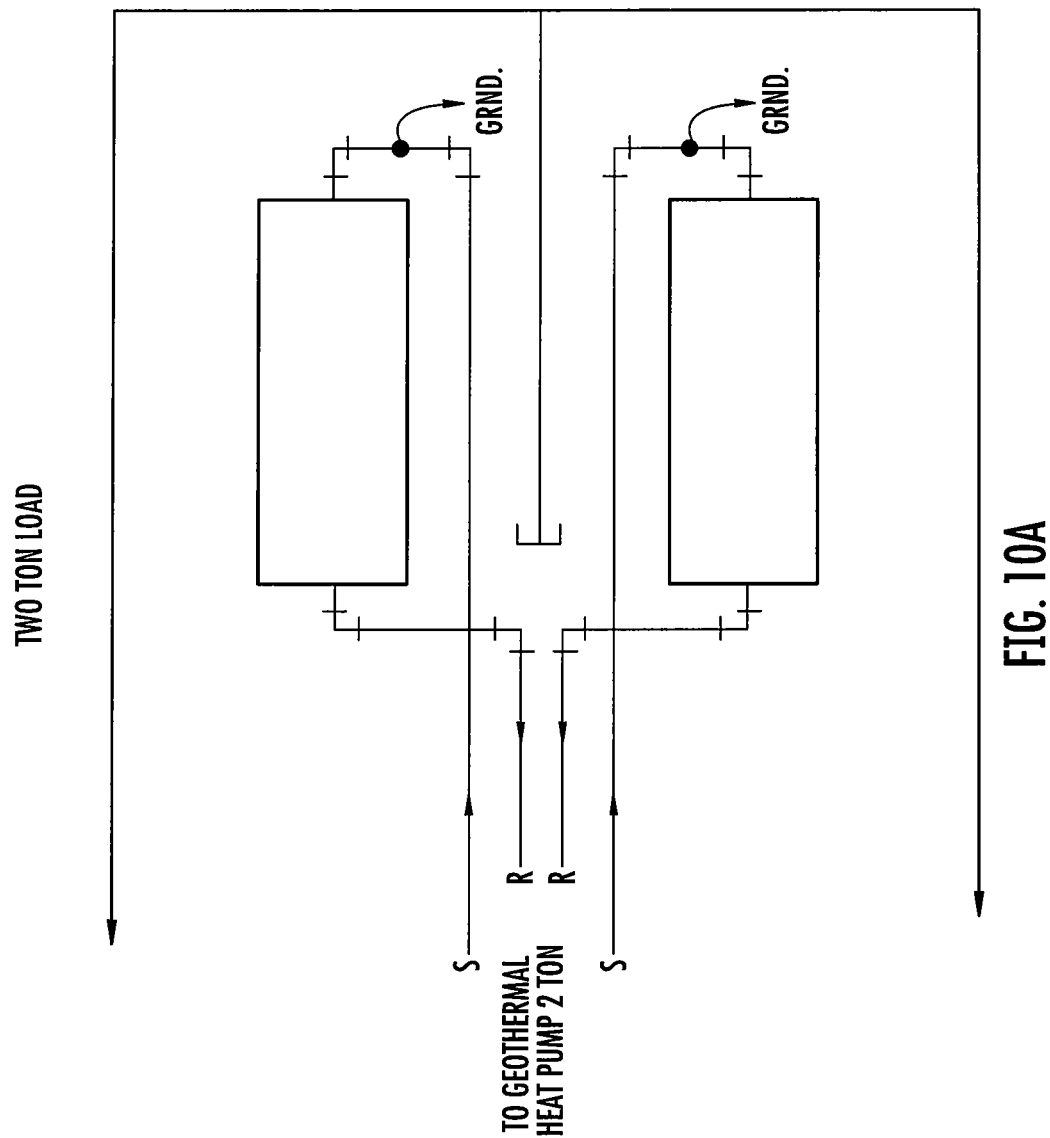
Figure 10B:
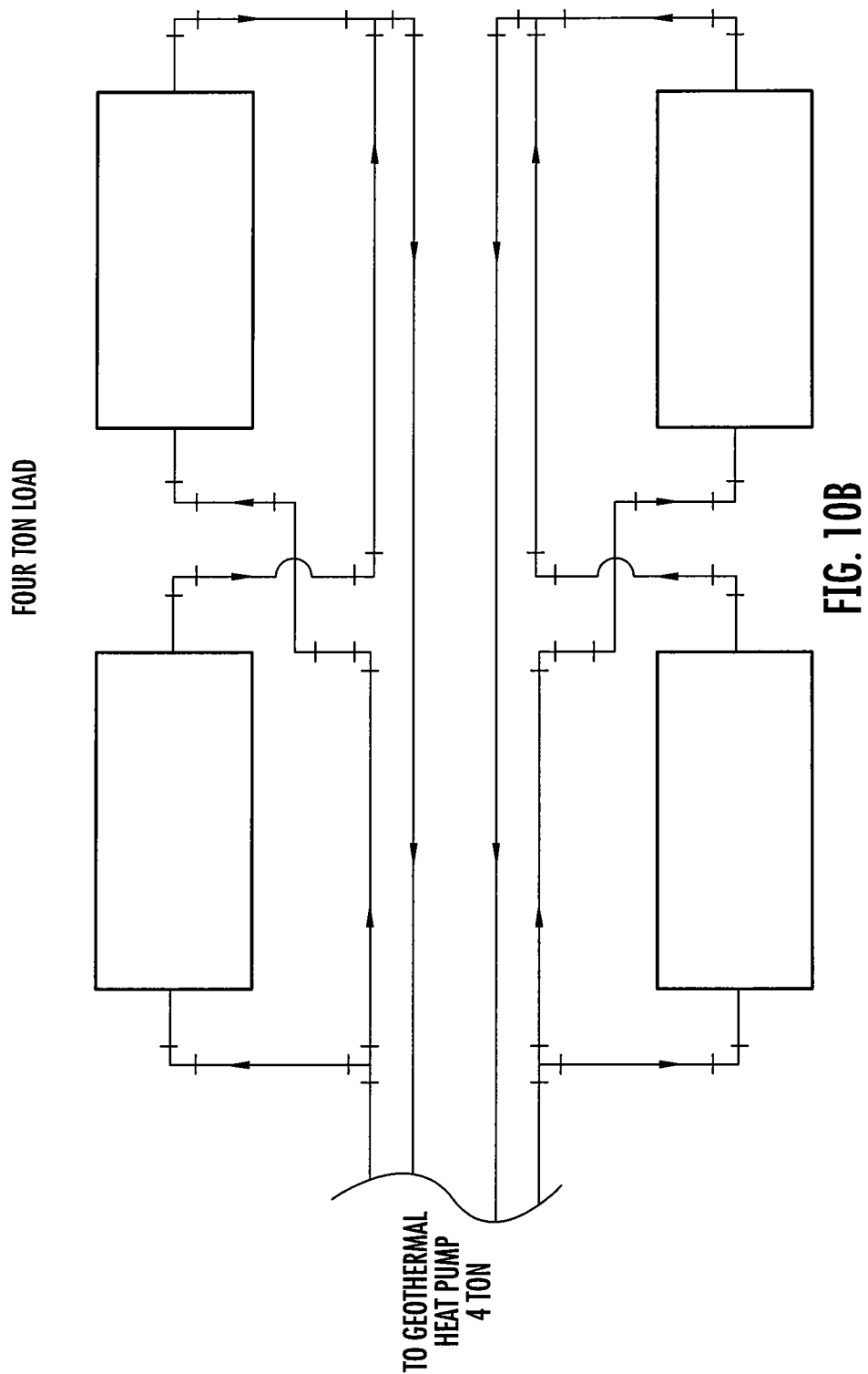
Figure 10C:
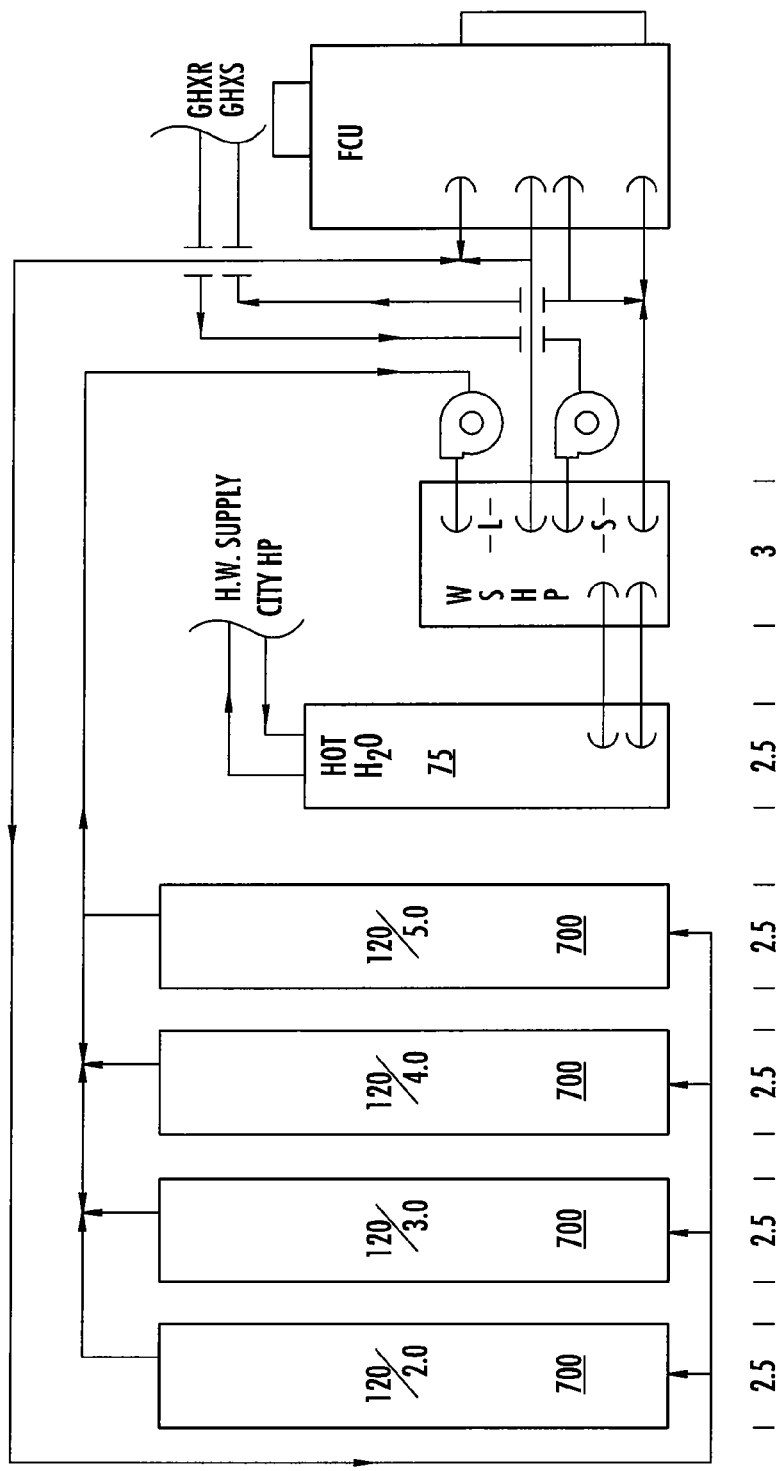
Figure 11:
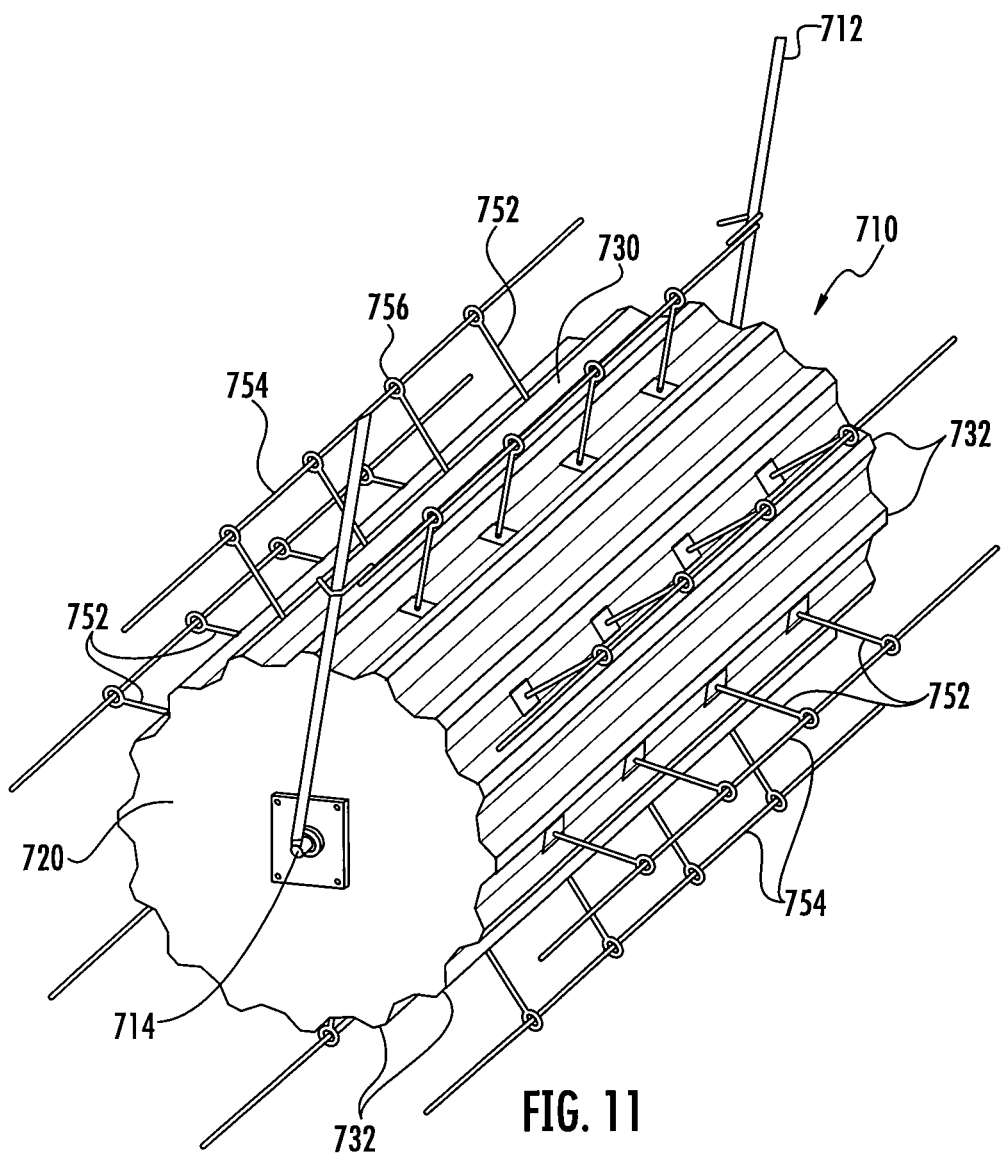
Figure 12:
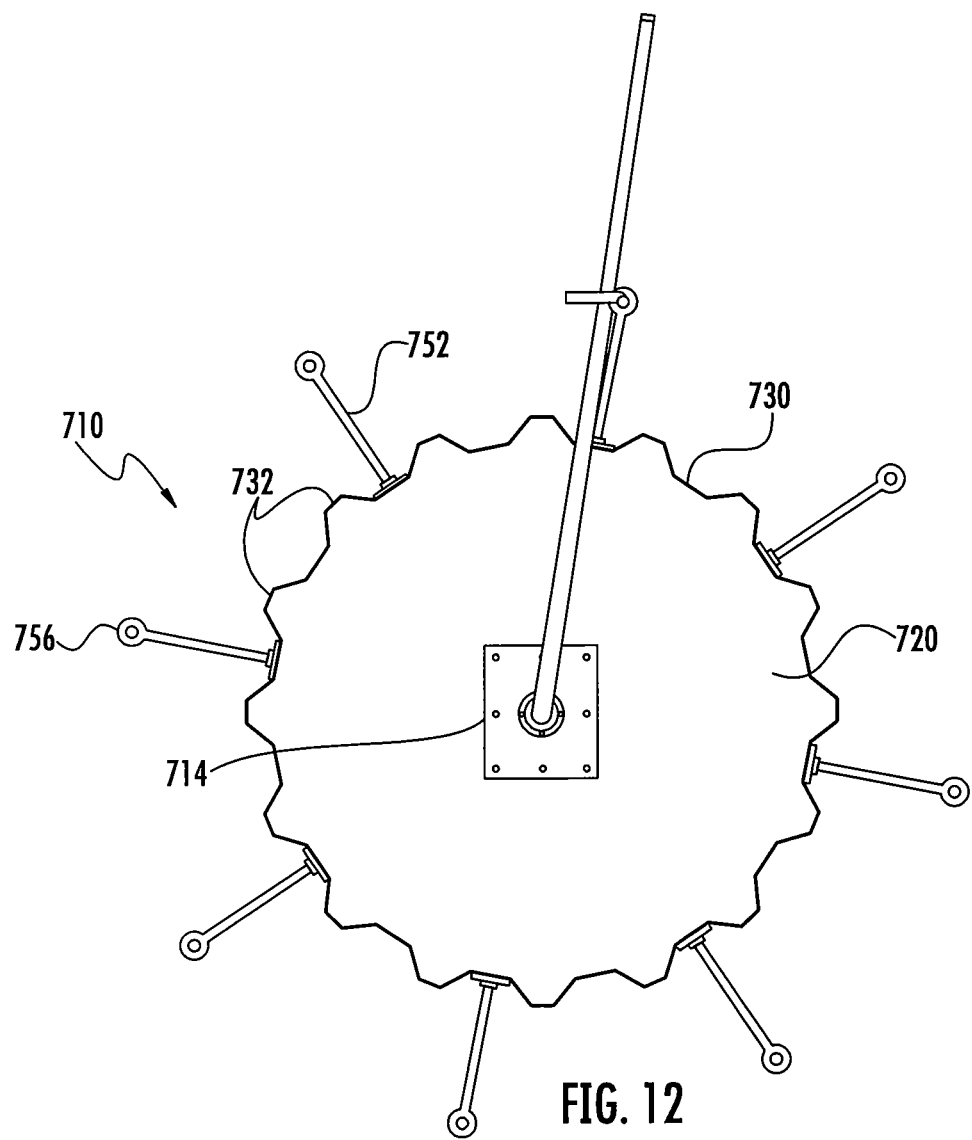
Figure 13:
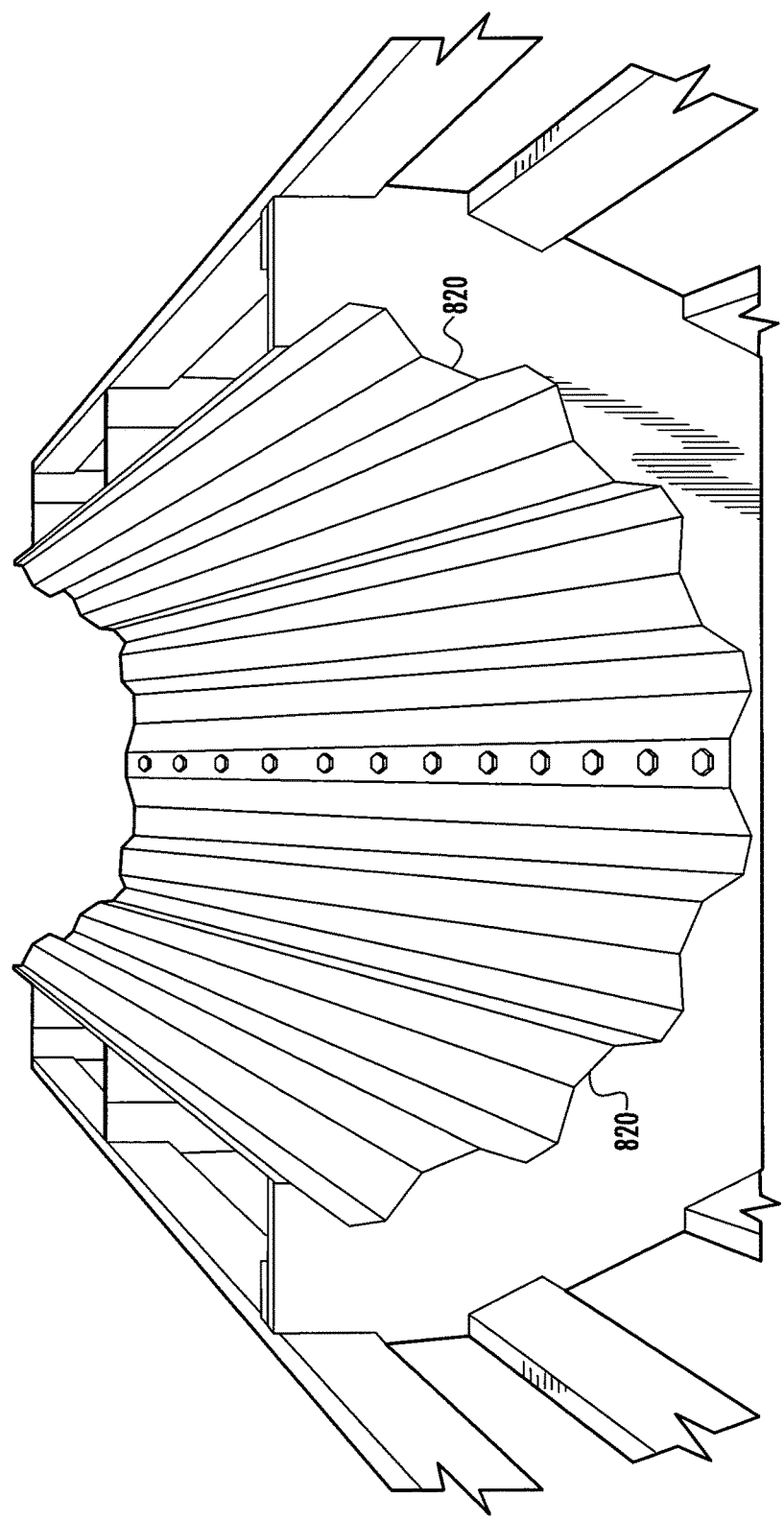
Figure 14:
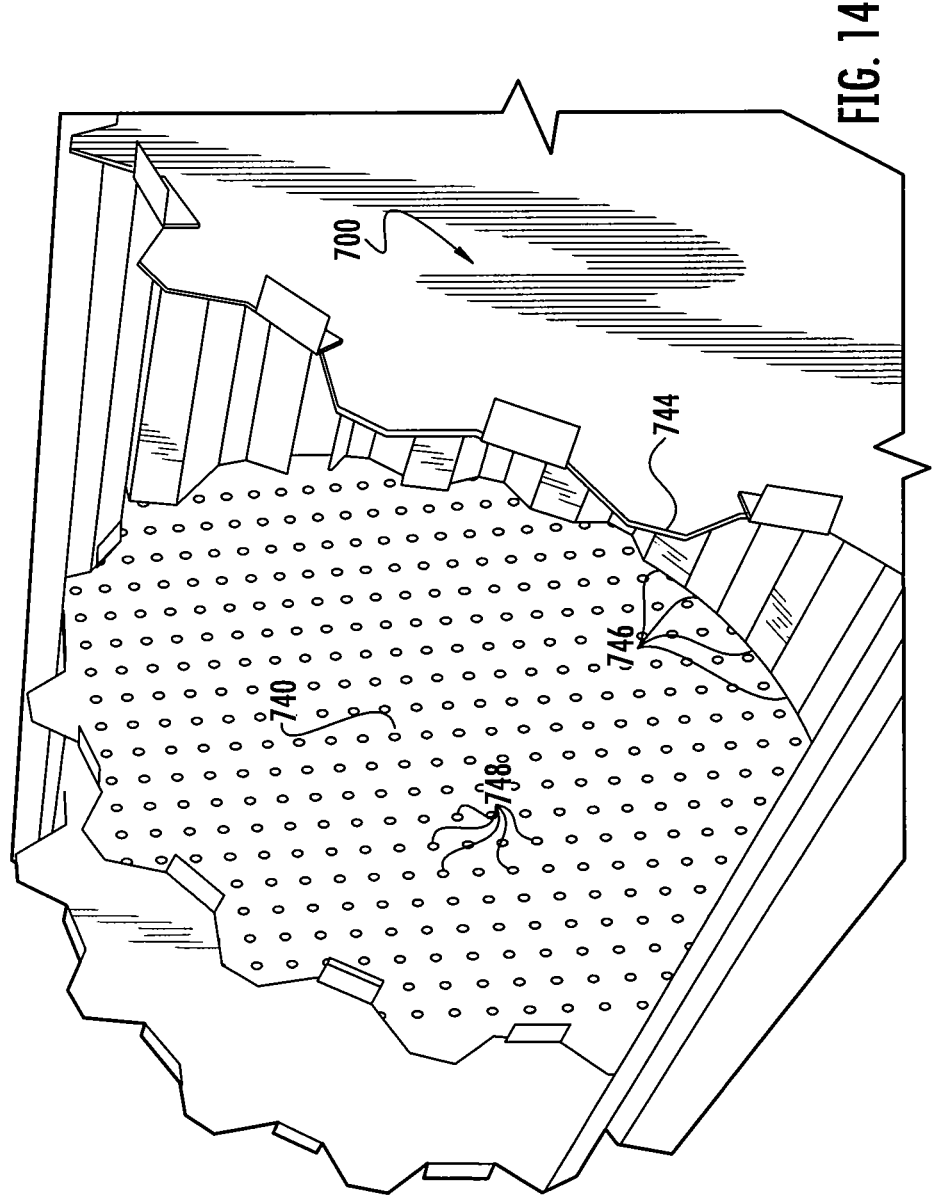
Figure 15:
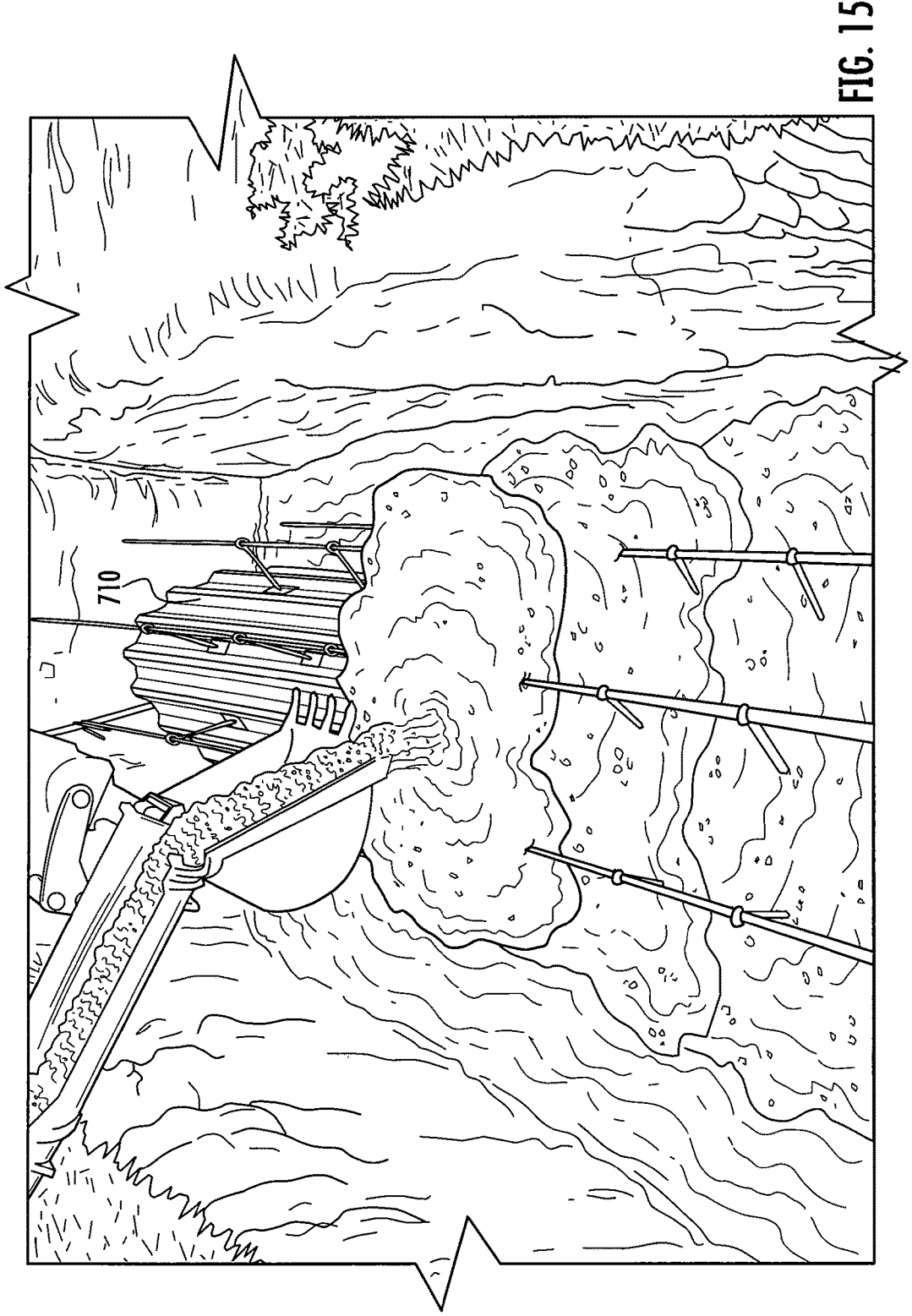
Figure 16:
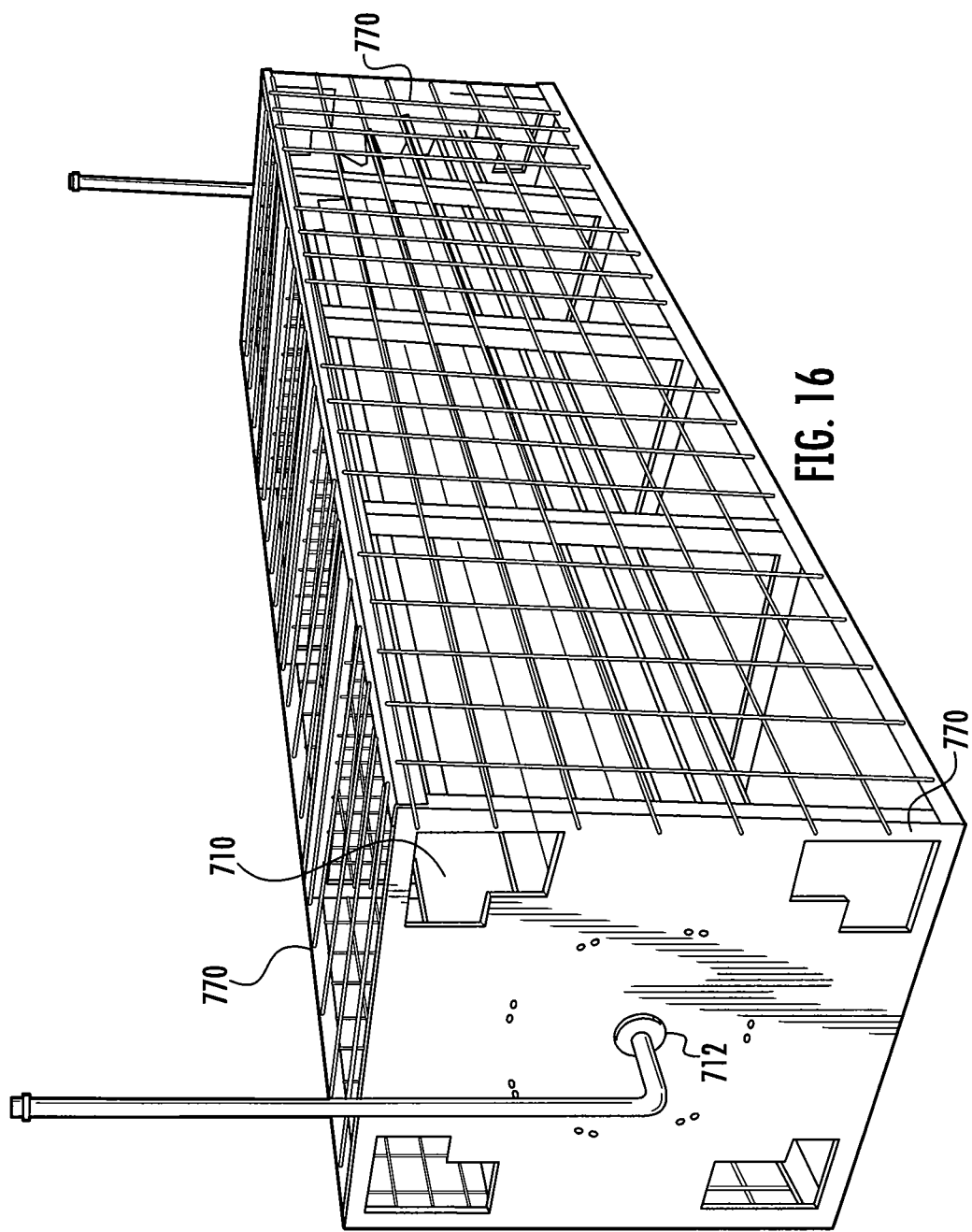

Having thus described embodiments of the invention in general terms, reference will now be made to the accompanying drawings, which are not necessarily drawn to scale, and wherein:

FIG. 1 illustrates a heating and cooling system incorporating a GEEB when operating during the summer months at Off Peak rates, in accordance with an embodiment of the present invention;

FIG. 2 illustrates a heating and cooling system incorporation a GEEB when operating during the winter at Off Peak rates, in accordance with an embodiment of the present invention;

FIG. 3 illustrates a heating and cooling system incorporating a GEEB when operating during the summer months at On Peak rates, in accordance with and embodiment of the present invention;

FIG. 4 illustrates a heating and cooling system incorporating a GEEB when operating during the winter at On Peak rates, in accordance with an embodiment of the present invention;

FIG. 5 illustrates a heating and cooling system incorporating a GEEB when operating during an intermediate season for cooling, in accordance with an embodiment of the present invention;

FIG. 6 illustrates a heating and cooling system incorporating a GEEB when operating during an intermediate season for heating, in accordance with an embodiment of the present invention;

FIG. 7 illustrates a heating and cooling system incorporating a GEEB and a domestic hot water supply wherein the hot water supply is heating during Off Peak utility periods, in accordance with an embodiment of the present invention;

FIG. 8A illustrates a side view cross-section of one embodiment of the GEEB, in accordance with one embodiment of the invention;

FIG. 8B illustrates a front view of one embodiment of the GEEB, in accordance with one embodiment of the invention;

FIG. 9A illustrates one embodiment of a cross-sectional area of a tank of the GEEB, in accordance with one embodiment of the invention;

FIG. 9B illustrates one embodiment of a cross-section area of a portion of the tank of the GEEB that is used to assemble the tank, in accordance with one embodiment of the invention;

FIG. 10A illustrates one embodiment of a GEEB in a two ton capacity, in accordance with one embodiment of the invention;

FIG. 10B illustrates one embodiment of a GEEB in a four ton capacity, in accordance with one embodiment of the invention;

FIG. 10C illustrates one embodiment of the indoor energy storage vessel used in combination, in accordance with one embodiment of the invention;

FIG. 11 illustrate a plane view of a tank for a GEEB, in accordance with one embodiment of the invention;

FIG. 12 illustrates a front view of a tank for a GEEB, in accordance with one embodiment of the invention;

FIG. 13 illustrates a plane view of two sections of the tank assembled, in accordance with one embodiment of the invention;

FIG. 14 illustrates a plane view of the tank with baffles, in accordance with one embodiment of the invention;

FIG. 15 illustrates a plane view of one embodiment of a tank for the GEEB, in accordance with one embodiment of the invention; and FIG. 16 illustrates a plane view of one embodiment of a tank for the GEEB being encased in concrete, in accordance with one embodiment of the invention.

DETAILED DESCRIPTION OF THE DRAWINGS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

One important aspect of the GEEB is that the thermal mass effect can be used for heating and cooling in all climates in all seasons of the year by exchanging thermal energy (Thermal Load) to and from an electrically powered water-to-water heat pump, water-to-air heat pump, to the ground, etc. (Thermal Source). Typical water source or geothermal heat pump systems on the market do not have the same ability for use in all climates in all seasons of the year. In these systems energy transfer is typically accomplished through the use of well water, a pond, lake, or river water, or through a High Density Poly Ethylene (HDPE) hermetically sealed tubing of hundreds of feet in length countersunk in the ground vertically, buried horizontally in the ground, or submerged in a pond. The HDPE tubing is then filled with a heat transfer fluid, including anti-freeze and corrosion inhibitors. HDPE geothermal source side heat exchange and piping systems account for 70-80% of new geothermal heat pump installations.

The HDPE geothermal source side energy exchange method has inherent heat transfer and storage properties that routinely result in unpredictable and poor operating performance, energy inefficiency, and/or catastrophic geothermal heat pump system failure because these systems do not apply the advantageous uses of thermal mass to heat and cool a structure. These types of configurations may be able to be used in some climates, however, there are issues with these systems. For example, there may be insufficient thermal contact or coupling of the HDPE tubing with the back-filled ground because the heat in the tube may cause the dirt in the ground to shrink away from the tubing resulting in reduced heat transfer. Also, the tubes can be subject to cracking, the fluid can freeze in some clients, or the fluid used may be very expensive because of the need for anti-freeze. Furthermore, the HDPE material itself is a thermal insulator that inhibits rather than conducts necessary heat transfer between the circulating geothermal heat transfer fluid (Load) and the ground (Source). Also, due to the short residence time and relatively small volume of heat transfer fluid inside of the of the HDPE tubing in the system the prior art cannot take advantage of thermal mass effect when applied to a traditional low mass residential structure. Therefore, the present embodiments of the GEEB are superior to the typical configurations in the art.

FIGS. 1 through 7 illustrate one embodiment of a heating and cooling system incorporating a GEEB. The system 10 has a water-to-water heat pump 20 with a refrigerant de-superheater, an air handling unit 30, circulating pumps 40, an insulated indoor mounted thermal energy storage vessel 50, and an underground heat exchanger 60. In some embodiments of the invention, the air handling unit 30 is an air handling unit or blower coil unit with water/air coils. In some embodiments the thermal energy storage vessel 50 is an insulated tank (i.e. concrete tank) that is mounted somewhere in the residence or commercial building. In some embodiments the heat exchanger 60 is a GEEB, which will be explained in greater detail later.

FIG. 1 illustrates an embodiment of the system when operating during the summer months at Off Peak rates. During off peak usage times, chilled water is generated by the water-to-water source heat pump 20 through the exchange of thermal energy between the indoor mounted thermal energy storage vessels 50 and the underground geothermal heat exchanger 60. The chilled water is then stored in the insulated indoor thermal energy storage vessel 50 for later use during On Peak electric utility rates. The heat removed from the chilled water is rejected to the underground geothermal heat exchanger 60 where it is cooled by the thermal mass and water and recycled back to the water-to-water heat pump 20. During this process the air handling unit 30 operates on standby, unless cooling of the structure is needed wherein the chilled water can be directed through the coils of the air handling unit 30. Alternatively, FIG. 3 depicts the operation of the system during the On Peak rates of the summertime. Instead of using the On Peak rates to power the heat pump 20 for generating chilled water to supply the air handling unit 30, the chilled water that was stored in the indoor thermal energy storage vessel 50 is used by the air handling unit 30 to cool the home. During this process the water-to-water heat pump 20 and the underground heat exchanger 60 are in standby mode.

FIG. 2 illustrates the heating system operating during the winter at Off Peak utility times. During this process hot water is generated by the water-to-water heat pump 20 through the exchange of thermal energy between the indoor mounted thermal energy storage vessel 50 and the underground heat exchanger 60. The heat is then stored in the insulated indoor thermal energy storage vessel 50 for later use during On Peak electric utility rates. The heat transfer fluid (i.e. water) returns to the heat exchanger 60 where it is heated by the geothermal energy. During this process the air handling unit 30 operates on standby, unless heating of the structure is needed wherein the hot water can be directed through the air handling unit to heat the structure. Alternatively, FIG. 4 illustrates the operation of the system during the winter On Peak utility rates. The hot water stored in the insulted indoor thermal energy storage vessel 50 is pumped through the coils of the air handler unit 30, for heating the structure. During the On Peak utility rates the water to water heat pump 20 and the underground heat exchanger 60 are on standby.

FIGS. 5 and 6 indicate the operation of the system during the intermediate seasons between winter and summer. During this period of time the heat transfer fluid or water in the underground heat exchanger 60 can be pumped through the air handler unit 30 coils to either heat or cool the structure depending on the ambient temperatures. During this process the water to water heat pump 20 and the insulated indoor thermal energy storage vessel 50 are in the standby mode.

FIG. 7 depicts that the domestic hot water supply tank 70 is connected to the water-to-water heat exchanger, which allows the heat pump to heat the domestic hot water supply during Off Peak utility periods. In other embodiments of the invention the domestic hot water supply tank 70 can be connected to the insulated indoor thermal energy storage vessel 50 to heat the domestic hot water supply tank during On Peak utility periods.

In one embodiment of the invention the underground heat exchanger 60 and the water source heat pump 20 are coupled to a highly insulated indoor thermal energy storage vessel 50 containing a large concrete, and/or liquid thermal mass. The underground heat exchanger 60 supports the water-to-water heat pump 20 in producing either hot or chilled water for storage and later use in the indoor thermal energy storage vessel 50. In one embodiment, the indoor thermal energy storage vessel 50 is insulated with a high R-value material and filled with a material with a high heat capacity, such as a concrete matrix. Furthermore in one embodiment, a refrigerant de-superheater can be connected to the system to heat domestic hot water in another cycle and store it in the domestic hot water storage tank 70 through an indirect heat exchanger coil or other means.

The thermal mass effect of the insulated indoor thermal energy storage vessel 50 makes it possible for the water-to-water source heat pump 20 to generate and store hot water required for the dwellings space heating, chilled water for air conditioning, and domestic hot water during Off Peak time periods when electric utility rates are lower. This thermal energy is stored for later use during On Peak time periods when electric utility rates are higher, resulting in a fuel economy to the dwelling owner or occupant. Based on the electric utility's discounted rates for Off Peak power usage and avoiding electrical usage during the higher On Peak times, a savings of as much as 80% per unit cost of all electrical power used for heating and cooling is possible compared to all other other conventional heating and cooling systems such as an air source heat pump, depending on the local electric utility's rate structure.

During the heating cycle at electrical grid Off Peak time periods only, circulating heat transfer fluid (i.e. water or other fluid) is heated by a water-to-water electric heat pump 20 and if necessary space heating is provided via the air handler unit 30. The heated water then continues to circulate into the insulated indoor thermal energy storage vessel 50 where its thermal mass is heated and that heat is stored for use in later time periods when electric utility rates are On Peak, thereby avoiding the higher On Peak rates and saving the home owner significant amounts of money for heating the dwelling during On Peak times.

During the air conditioning cycle at electrical grid Off Peak time periods only, circulating heat transfer fluid (i.e. water or other heat transfer fluid) is chilled by a water-to-water heat pump 20 and if necessary space air conditioning is provided via the air handler unit 30. The chilled water then continues to circulate into the insulated indoor thermal energy storage vessel 50 where the thermal mass is cooled down and that "cool" energy is stored for use in time periods when electric utility rates are On Peak, thereby avoiding the higher On Peak rates and saving the home owner significant amounts of money for cooling the dwelling during On Peak times.

In one embodiment the system can be controlled by an environmental control unit containing a microprocessor that automatically adjusts how the structure is either heated or cooled depending on the temperature of the outside air, the temperature of the indoor storage tank, the temperature of the underground geothermal heat exchanger, and the On Peak and Off Peak rates of the electric utility.

The system can be altered and still perform in the same general manner. For example, in other embodiments the GEEB can be made of other materials or combination of materials that have a high capacity to store heat and a high thermal conductivity. In other embodiments the indoor thermal energy storage vessel 50 can use other types of materials other than the concrete matrix to store the thermal energy produced during Off Peak hours. The system does not have to run strictly on electric power from the utility company. In other embodiments it can run on any type of power source or combination of power sources, such as, natural gas, oil, steam, solar power, or wind power, etc. The water-to-water heat pump may be replaced with other heat exchangers and the fluids in the system may be exchanged with other types of fluids, such as air, or coolant, etc.

FIGS. 8A through 9A illustrate one embodiment of the heat exhanger 60 used in the system 10. The heat exchanger 60 in one embodiment of the invention is a GEEB 700. In one embodiment of the GEEB 700 is a container 710 and is buried in the ground and surrounded at least partially, and in some embodiments, completely by a mass 750. The container 710 in some embodiments has an inlet 712 and an exit 714. The container 710 in some embodiments is filled with fluid (i.e. water), which is used throughout the system for heating and cooling purposes. As previously discussed, depending on the season and time of day, the liquid in the container 710 is either being cooled or heated by the surrounding ground. In some embodiments, as the fluid enters the inlet 712 it is cold from heating the structure. As it passes through the container 710, it is heated by the mass 750 surrounding the container 710, which gets its heat from the surrounding ground temperature. In other embodiments of the invention, as the fluid enters the inlet 712 it is warm from cooling the structure. As the warm fluid passes through the container 710, it is cooled by the mass 750 surrounding the container 710, which gets its cooling ability from the ground surrounding the mass 750.

Since the GEEB 700 is buried at a depth where the earth's temperature is near constant year round, the thermal mass of the GEEB 700 will slowly approach the temperature of the soil surrounding it. Eventually the GEEB 700 mass will reach equilibrium, such that the temperature of the thermal mass of the GEEB 700 and water or other fluid will be the same temperature as the soil surrounding it, which is typically between 50° to 60° F. Due to the thermal storage characteristics, load to source thermal coupling, and thermal mass effect of the concrete, the GEEB 700 has the ability to gather, store and later release significant and predictable amounts of thermal energy to and from the earth (source) and the dwelling structure (load).

In one embodiment, the thermal energy can be transferred to and from the GEEB 700 and the residential dwelling structure through the heat transfer fluid (i.e. water or other fluid) piping to assist in heating and cooling the structure. The fluid is utilized to provide heat rejection from the water-to-water heat pump's cooling in the air conditioning cycle and heat absorption in the heating cycle of the water-to-water heat pump. The fluid is then recycled back to the underground GEEB 700 where the dwellings thermal energy now contained in the fluid is exchanged with the thermal energy stored in the thermal mass of the GEEB 700.

It is important to note that as the GEEB 700 heats up and cools down throughout different seasons of the year, the circulating heat transfer fluid can provide heating and cooling directly to the dwelling without the operation of the electric heat pump. For example, in the spring and early summer, after transferring heat from the GEEB 700 to the dwelling all winter via a water source or geothermal heat pump, the GEEB's thermal mass 750, the heat transfer fluid, and the entire thermal mass of the ground within a 4' to 6' thermal zone of influence surrounding the GEEB can be cold enough to provide cooling in the structure for some period of time. This is known as seasonal thermal energy storage. Conversely, in the fall and early winter, after the air conditioning cycle has rejected heat to the GEEB all summer, the heat exchanger's thermal mass 750, the stored heat transfer fluid (i.e. water or other fluid), and the thermal mass of the ground within a 4' to 6' zone of thermal influence will be warm enough to provide space heating to the structure for some period of time in the fall and winter months. In one embodiment of the invention, the aggregate thermal mass of the GEEB 700 including the thermal mass 750 (i.e. concrete), mold or form (i.e. tank or container 710), heat transfer fluid, and the surrounding 4'-6' of ground within the zone of thermal influence can be as much as 1,000,000 pounds which will support up to 1000 ton/hours of cooling by the Water Source or Geothermal heat pump.

In some embodiments of the invention, as illustrated in FIG. 9A the container 710 has a container wall 730 with at least one protuberance 732 extending from the container 710. In some embodiments of the invention, the protuberances 732 can vary in size and shape. In some embodiments there may be a small protuberance 734 and a large protuberance 736. The protuberances 732 serve many functions. For example, the protuberances 732 provide increased surface area of the container 710, increased volume of fluid, increased flow along the surface of the container 710, and/or increased structural properties. The larger the surface area between the mass 750 and the container 710 the more heat will transfer between the mass 750 and the container wall 730, and thus the mass 750 and the fluid inside the container 710. The increased volume and flow rate in the container 710 allows for more fluid in the system, and thus more heating and cooling ability for the system. Therefore, the system can support the heating and cooling needs of bigger structures. The increased structural properties of the protuberances 732 allow for the container 710 to support the weight of the mass 750, ground, people, structures, vehicles, etc. that could sit on top of the container 710.

In some embodiments of the invention, the container 710 is a tubular member that is twelve (12) feet long, has a twenty-four (24) to fort-eight (48) inch diameter. However, it is understood that any length and diameter, or cross-sectional area will work, and will be dependent in part on the size of the structure it will help to heat and cool. In some embodiments the protuberances 732 are triangle shaped as illustrated in FIGS. 9A and 9B, however, in other embodiments of the invention the protuberances 732 are any other type of shape that increases the surface area of the container 710. In some embodiments of the invention the container 710 is made of steel, however, it can be made of any type of material. In some embodiments, of the invention it is desirable to make the container 710 out of a material with good heat transfer capabilities, such as copper. In some embodiments of the invention the container 710 is in sheet form and rolled into the desired configuration. As illustrated by FIGS. 9A and 9B, a rolled container 710 with protuberances 732 can be made. The container 710 in some embodiments can have two or more sections. In one embodiment the container 710 may have a container housing 716 and a container cover 718. The container cover 718 can be attached to the container housing 716 in a number of ways to seal the container 710, for example, it can be welded, tack welded and sealed, the container 710 can have tabs 810 that are riveted and sealed, screwed together and sealed, slid or snapped channels and sealed, bolted and sealed, etc. The ends 720 of the container 710 are also sealed. The sealing in some embodiments is performed though the use of a waterproof gel, tape, caulks, welding, etc. in order to prevent the fluid from leaking out of the container.

In some embodiments of the invention the container 710 has at least one interior member, such as a baffle 740, which can serve multiple functions. For example, the baffle 740 can increase the turbulence of the fluid flow through the container 710. Increasing the turbulence of the fluid flow allows more fluid to reach the container walls 730 and the protuberances 732, which improves the heat transfer between the fluid and the mass 750 and allows more heat transfer between the two substances. This is because more heat is transferred between the mass 750 and the fluid close to the container walls 730. If the same fluid is always or almost always at or near the container walls 730 then the fluid located near the center of the container 710 will not transfer as much heat with the mass 750 as the fluid located near the container walls 730. The increased turbulence reduces the amount of stagnate fluid and forces fluid from the center of the container 710 to the container walls 730, and vice versa. The second benefit provided by the at least one baffle 740, is that is also serves as additional structural support for the container 710, on top of the structural support provided by the protuberances 732. The additional structural support prevents the container 710 from collapsing on itself under the weigh of the mass 750 that surrounds the container 710 when it is buried in the ground, as well as any structures, people, vehicles, etc. that could also be located on top of the container 710.

Due to the increased surface area of the container 710, the GEEB 700 can achieve improved heat transfer over conventional heat exchangers that are buried underground. The increase in surface area could be fifty times, one-hundred times, two-hundred times, or over three-hundred times more surface area then the conventional heat exchangers. As previously discussed, the conventional heat exchangers are plastic coiled tubes, typically with one-inch diameters that are buried underground. This type of configuration has a number of associated issues. For example, the plastic coil can fracture under pressures in the ground and create a leak, ground shrinkage around the tubes can cause the tubes to crack, and the length of the coiled tube is so long that the structure may need a large yard in order to bury enough of the coiled tube for the system to heat and cool the desired structure, to name a few.

In some embodiments of the invention the mass 750, as previously discussed, is concrete or aggregate that is poured around the container 710 after the container 710 is placed in the ground. As previously discussed, the concrete takes some time to reach a thermal equilibrium with its surroundings, however, it is an excellent thermal storage material. Once the concrete reaches the temperature of its surroundings it will hold that temperature for a long period of time. In some embodiments of the invention, enough thermal mass 750 is used to surround the container 710 in order to provide six hours or more of heat transfer to the overall system during Off-Peak energy time. Other amounts and types of thermal mass, besides concrete, are used in order to provide the desired amount and time of heat transfer necessary to heat or cool a structure during On-Peak energy usage times.

In some embodiments of the invention the mass 750 will have mass heat transfer elements 752, such as ribs, projections, a matrix, etc. within the mass 750 as illustrated in FIG. 8A. The mass heat transfer elements 752 help to provide more heat transfer between the mass 750 and the container wall 730. The most heat transfer will be occurring at the surfaces of the mass 750 and the container wall 730 that are in direct contact with each other. In order to improve the heat transfer capabilities, the mass heat transfer elements 752 are added to the mass 750 to pull/push additional heat transfer along the mass heat transfer elements 752 to the container walls 730 from other areas in the mass 752 that are not in direct contact with the container walls 730.

In some embodiments of the invention the container 710 will have container heat transfer elements 742, such as ribs, projections, a matrix, etc. within the container 710, as illustrated in FIG. 9A. As is the case with the mass heat transfer elements 752, the container heat transfer elements 742 will work to provide better heat transfer to the fluid located near the center of the container 710, which is away from the container wall 730 where most of the heat transfer is occurring. The container heat transfer elements 742 could be the baffle 740 in some embodiments, however, in other embodiments the container heat transfer elements 742 could be in addition to the baffle 740. Another benefit of the container heat transfer elements 742 is that they, in addition to the baffle 704 will provide increased turbulence to the fluid located in container 730.

In some embodiments of the invention, there can be more than one GEEB 700 working in parallel (and in some cases in series) to heat and cool a structure. The typical amount of fluid needed to heat or cool an average sized residential structure is about 6 to 12 gallons/per minute. In some embodiments, the GEEBs 700 are arranged to provide this amount of fluid. However, in other embodiments of the invention the amount of fluid needed for heating and cooling varies depending on the location of the residence and the size of the residence. The GEEBs 700 are used and sized in order to provide the necessary heating and cooling to a residence (or commercial building or other structure) based on the size and location of the residence. FIG. 10A illustrates a two ton system utilizing two GEEBs 700 to provide the heating and cooling needs of a customer. FIG. 10B illustrates a four ton system utilizing four GEEBs 700 to provide the heating and cooling needs of a customer.

As illustrated in FIG. 10C, there can be more than one indoor mounted thermal energy storage vessels 50 working in parallel (and in some cases in series) to heat and cool a structure. The indoor mounted thermal energy storage vessels 50 are used and sized in order to provide the necessary heating and cooling capacity to a residence (or commercial building for that matter) based on the size and location of the residence. In some embodiments of the invention the water source heat pump (WSHP or water-to-water heat pump 20) and the fan coil unit (FCU or air handling unit 30), circulating pumps 40, thermal energy storage vessels 50, as well as the other components are included together in an indoor heating and cooling system that is mounted, wired, and plumbed together in the house, residence, or commercial building. The systems 10 can, in some embodiments, be built into a module that is manufactured, tested, and shipped to a construction site and situated in the garage, basement, or other location, eliminating the need for field engineering and assembly of current systems when a property owner wants to install a GEEB 700.

In some embodiments the geothermal energy exchanger and battery 700 needs only to be buried just under the surface of the ground, for example approximately four feet deep in some central or southern areas of the United States. In other embodiments of the invention, the geothermal energy exchanger and battery 700 needs to be buried at greater depths, such as in the northern regions of the United States, in order to be far enough away from the ground surface temperatures to get a fairly uniform ground temperature across the seasons. The depth to bury the geothermal energy exchanger and battery 700 is determined on a case by case basis depending on the location and the temperatures of the ground at different depths throughout the year.

FIGS. 11 through 16 illustrate various embodiments of the GEEB 700 and container 710. For example, FIG. 11 illustrates another type of container 710. The container 710 is illustrated as a generally tubular structure with sealed ends 720, however in other embodiments the container 710 can be various general shapes, such as but not limited to a square, rectangle, triangle, hexagon, octagon, etc. As illustrated in FIGS. 11 and 12 the container 710, in this embodiment has an inlet 712 and exit 714. The container also has a plurality of protuberances 732. In this embodiment the protuberances 732 are one-half hexagonal shapes that run along the length of the container wall 730 and increase the surface area of the container 710, but as previously discussed can be a variety of different shapes.

In FIGS. 11 and 12 the mass heat transfer elements 752 are operatively coupled to the container 710 to increase the heat transfer between the mass 750, the container 710, and the fluid flowing through the container 710. In some embodiments of the invention two or more mass heat transfer elements 752 are connected through mass heat transfer connection elements 754. The mass heat transfer connection elements 754 provide additional heat transfer between the mass 750 and the container 710. The mass heat transfer elements 752 and mass heat transfer connection elements 754 may be made from a material with high thermal conductivity greater than that of the thermal mass 750. Therefore, the heat transfer elements 752 and mass heat transfer connection elements 754 may help transfer heat stored in the areas of the thermal mass 750 that are located farther away from the container 710 to the container wall 750. Therefore, the mass heat transfer elements 752 and mass heat transfer connection elements 754 may help improve the efficiency of the GEEB 700. In the illustrated embodiments, the mass heat transfer elements 752 are rods with open eyelets 756 and the mass heater transfer connection elements 754 are rods that are threaded through the eyelets 756. The heat transfer elements 752 are screwed into plates located on the container walls 720. However, in other embodiments the mass heat transfer elements 752 and mass heat transfer connection elements 754 may be various shapes, sizes, and materials, and by be operatively coupled to each other or the container 710 in a number of ways.

As illustrated in FIGS. 13 and 14 the container 710, in some embodiments, is separated into sections 820 that are easy to stack and transport. The sections 820 are operatively coupled together and sealed through the methods already described, and as illustrated in FIG. 13. The sections can be created for stackability, ease of transportation, and interchangeability between containers 710. Any edges of the container 710 can be sealed with a waterproof material that will prevent any of the heat exchanger fluid from leaking out of the container 710 and reducing the heat exchanging properties of the geothermal energy exchanger and battery 700.

As illustrated in FIG. 14, in some embodiments, the baffles 740 have baffle protrusions 744, which in some embodiments are made to match up with the one or more protuberances 732 in the container walls 730. In some embodiments the baffles 740 have protrusion free locations 746, to allow the heat transfer fluid to pass between the container wall 730 and the baffles 740. In some embodiments the baffles 740 are positioned with the protrusion free locations 746 staggered, to increase the turbulence in the heat exchanger fluid. In some embodiments of the invention the protrusion free locations 746 are staggered in order to create a cork screw movement of the heat exchanger fluid within the container. For example, if a container 710 cross-section is described in terms of a clock the first baffle 740 may have a protrusion free location 746 located at twelve (12) o'clock, the second baffle 740 may have a protrusion free location 746 located at three (3) o'clock, the third baffle 740 may have a protrusion free location 746 located at six (6) o'clock, and a fourth baffle 740 may have a protrusion free location 746 located at nine (9) o'clock. In other embodiments, any number of baffles 740 and protrusion free locations 746 can be used within the container 710.

As further illustrated in FIG. 14, in some embodiments one or more baffles 740 may have diffuser holes 748 to create turbulent flow inside of the container 710. In some embodiments, the diffuser holes 748 may only be used near the baffle 740 at the inlet 712 in order to break up the flow of heat exchanger fluid entering the container 710 from in the inlet 712. In some embodiments of the invention, a nozzle 712a may be located at the inlet 712 in order to create turbulent flow entering the container 710 from the inlet 712, as illustrated by FIG. 8A. The nozzle 712a may also be described as an eductor or jet pump.

As illustrated by FIG. 15, the container 710 can be lifted and placed into the hole dug in the ground approximately twelve (12) feet deep. As illustrated, the top of the container 710 will be located approximately four (4) feet below the surface of the ground. At this depth the GEEB 700 may maintain a relatively constant temperature throughout the year, for example fifty (50) to sixty (60) degrees Fahrenheit. In some embodiments of the invention the container 710 can be placed on top of some concrete that has already been poured and allowed to set before the rest of the concrete (other thermal mass 750 material) is poured around it. In other embodiments of the invention the container 710 can be lowered into position and held in place (e.g. by a backhoe) as the concrete is poured around the container. The container 710 may need to be held in place to maintain the correct location in the hole and prevent it from rising up in the hole as the concrete is poured around it. After the concrete is poured and sets the hole can be filled with dirt, and in some embodiments of the invention, after the dirt is filled in the ground above the geothermal energy exchanger and battery 700 can be paved or built upon.

In some embodiments of the invention the container 710 may have a support structure 770, such as a cage, beams, wire mesh, etc. that can server a number of functions. In some embodiments the support structure 770 can serve as or work in connection with the mass heat transfer elements 752. Therefore the support structure 770 may be attached to the container surface 730 or the mass heat transfer elements 752. Therefore, the support strtucture 770 may help to transfer heat to and from the container surface 730 into the thermal mass 750. The support structure 770 may also provide additional support to the container 710 in order to prevent the mass 750 from damaging the container 710.

In some embodiments of the invention the GEEB 700 can have an access port, such as a hatch. The port can allow a person to climb down into the container 710 to make any necessary repairs, such as sealing issue, without having to rip out the all the concrete and replace the entire unit.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A geothermal energy exchanger and battery container comprising:
    a container housing, wherein the container housing comprises a first end, a second end and a longitudinal axis extending from the first end to the second end, wherein the container housing further comprises:
        a plurality of protuberances extending longitudinally along an outer surface of the container housing and protruding outwardly away from the outer surface of the container housing to form a corrugated container housing, wherein the plurality of protuberances have an interior surface and an exterior surface, wherein an inner surface of the container housing and the interior surface of the plurality of protuberances together define an interior volume of the container housing, wherein the plurality of protuberances comprise four or more protuberances extending longitudinally along the outer surface of the container housing;
        two or more longitudinal edges extending longitudinally along an outer surface of the container housing, wherein the container housing is formed by fastening the container together at the two or more longitudinal edges;
    one or more plate baffles, wherein the one or more plate baffles are located within the container housing between the first end and second end of the container housing, each plate baffle of the one or more plate baffles comprising a planar surface positioned perpendicularly to the direction of flow of a heat transfer fluid between the first end and the second end, and a baffle circumference positioned proximate the inner surface of the container housing, wherein a first portion of the baffle circumference comprises three or more protrusions that are nested within and are at least partially enclosed by the interior surface of the plurality of protuberances of the container housing such that each of the three or more protrusions of the first portion extend radially outwardly past an adjacent outer surface of the container housing to contact the interior surface of a proximate protuberance of the plurality of protuberances in the container housing, and a second portion of the baffle circumference comprises one or more protrusion free locations; and
    wherein the geothermal energy exchanger and battery container is configured to be at least partially surrounded by a thermal mass, and wherein the geothermal energy exchanger and battery container is configured to be operatively coupled to a temperature control system for regulating the temperature of a structure by utilizing the heat transfer fluid.

2. The geothermal energy exchanger and battery container of claim 1, wherein the container further comprises a plurality of heat transfer elements, wherein each of the plurality of heat transfer elements are in contact with the container housing.

3. The geothermal energy exchanger and battery container of claim 1, wherein the one or more plate baffles comprise diffuser holes to allow the heat transfer fluid to pass through the plate baffle and increase the turbulence of the heat transfer fluid.

4. The geothermal energy exchanger and battery container of claim 1, wherein the one or more protrusion free locations of the one or more plate baffles are configured to increase the turbulence of the heat transfer fluid in the container, wherein the one or more plate baffles are configured to increase the structural support of the container.

5. The geothermal energy exchanger and battery container of claim 2, wherein the plurality of heat transfer elements further comprise mass heat transfer elements, wherein the mass heat transfer elements are positioned on the exterior of the container housing and are at least partially encased in the thermal mass and improve the heat transfer between the thermal mass and the container.

6. The geothermal energy exchanger and battery container of claim 2, wherein the plurality of heat transfer elements further comprise container heat transfer elements, wherein the container heat transfer elements are positioned in the interior of the container housing, and are configured to improve the heat transfer between the container and the heat transfer fluid.

7. The geothermal energy exchanger and battery container of claim 1, wherein the container is comprised of two or more sections that can be operatively coupled to one another at the two or more longitudinal edges to form the container; and wherein the two or more sections can be stacked for ease of storage and transport.

8. The geothermal energy exchanger and battery container of claim 1, wherein the container is made from steel for its structural strength and conductive properties and wherein the thermal mass is concrete for its high specific heat, high density and low thermal conductivity.

9. A geothermal energy exchanger and battery container comprising:
- a container housing, wherein the container housing comprises a first end, a second end, a longitudinal axis extending from the first end to the second end, an inlet operatively coupled to the first end, and an outlet operatively coupled to the second end, wherein the container housing further comprises:
  - a plurality of protuberances extending longitudinally along an outer surface of the container housing and protruding outwardly away from the outer surface of the container housing to form a corrugated container housing, wherein the plurality of protuberances have an interior surface and an exterior surface, wherein an inner surface of the container housing and the interior surface of the plurality of protuberances together define an interior volume of the container housing, wherein the plurality of protuberances comprise four or more protuberances extending longitudinally along the outer surface of the container housing,
  - two or more longitudinal edges extending longitudinally along an outer surface of the container housing, wherein the container housing is formed by fastening the container together at the two or more longitudinal edges;
- one or more plate baffles, wherein the one or more plate baffles are located within the container housing between the first end and second end of the container housing, each plate baffle of the one or more plate baffles comprising a planar surface positioned perpendicularly to the direction of flow of a heat transfer fluid between the first end and the second end, and a baffle circumference positioned proximate the inner surface of the container housing, wherein a first portion of the baffle circumference comprises three or more protrusions that are nested within and are at least partially enclosed by the interior surface of the plurality of protuberances of the container housing such that each of the three or more protrusions of the first portion extend radially outwardly past an adjacent outer surface of the container housing to contact the interior surface of a proximate protuberance of the plurality of protuberances in the container housing, and a second portion of the baffle circumference comprises one or more protrusion free locations; and
- a nozzle operatively coupled to the inlet, wherein the nozzle is configured to create turbulent flow in the heat transfer fluid located within the container housing.

10. The geothermal energy exchanger and battery container of claim 9, wherein the one or more plate baffles are configured to increase the turbulence of the heat transfer fluid in the container, and provide structural support to the container.

11. The geothermal energy exchanger and battery container of claim 9, wherein the container further comprises structural supports at least partially covering the container; and wherein the structural supports increase the structural security of the container.

12. The geothermal energy exchanger and battery container of claim 11, wherein the structural supports also act as mass heat transfer elements; and wherein the structural supports increase the heat transfer between the container and a thermal mass at least partially surrounding the container, and thus between the container and the heat transfer fluid.

13. The geothermal energy exchanger and battery container of claim 9, wherein two or more containers are utilized to provide the necessary capacity for controlling the temperature of a structure by utilizing the heat transfer fluid.

14. A geothermal energy exchanger and battery apparatus comprising:
- a container configured to hold a heat transfer fluid, wherein the container comprises a first end, a second end and a longitudinal axis extending from the first end to the second end, wherein the container comprises, wherein the container further comprises:
  - at least one input to receive the heat transfer fluid from a temperature control system and at least one output to provide the heat transfer fluid to the temperature control system;
  - a plurality of protuberances extending longitudinally along an outer surface of the container and protruding outwardly away from the outer surface of the container to form a corrugated container housing, wherein the plurality of protuberances have an interior surface and an exterior surface, wherein an inner surface of the container and the interior surface of the plurality of protuberances together define an interior volume of the container, wherein the plurality of protuberances comprise four or more protuberances extending longitudinally along the outer surface of the container housing;
  - two or more longitudinal edges extending longitudinally along an outer surface of the container housing, wherein the container housing is formed by fastening the container together at the two or more longitudinal edges; and
  - one or more plate baffles, wherein the one or more plate baffles are located within the container between the first end and second end of the container, each plate baffle of the one or more plate baffles comprising a planar surface positioned perpendicularly to the direction of flow of the heat transfer fluid between the first end and the second end, and a baffle circumference positioned proximate the inner surface of the container, wherein a first portion of the baffle circumference comprises three or more protrusions that are nested within and are at least partially enclosed by the interior surface of the plurality of protuberances of the container housing such that each of the three or more protrusions of the first portion extend radially outwardly past an adjacent outer surface of the container housing to contact the interior surface of a proximate protuberance of the plurality of protuberances in the container housing, and a second portion of the baffle circumference comprises one or more protrusion free locations;
- a thermal mass, wherein the thermal mass incases at least a portion of the container, wherein the thermal mass is configured to transfer heat to and from the container and heat transfer fluid in the container to heat the heat transfer fluid when the heat transfer fluid is colder than the thermal mass and cool the heat transfer fluid when the heat transfer fluid is warmer than the thermal mass;

wherein the one or more plate baffles direct the heat transfer fluid through the one or more protuberances adjacent the one or more protrusion free locations, and prevent flow of the heat transfer fluid through the one or more protuberances in contact with the three or more protrusions of the one or more plate baffles; and wherein the geothermal energy exchanger and battery apparatus is configured to be at least partially buried in the ground and operatively coupled to the temperature control system for controlling the temperature of a dwelling by utilizing heat transfer properties of the heat transfer fluid.

15. The geothermal energy exchanger and battery apparatus of claim 14, wherein the heat transfer fluid is water, wherein the container is made from steel and wherein the thermal mass is made from concrete.

16. The geothermal energy exchanger and battery apparatus of claim 14, further comprising a plurality of heat transfer elements, wherein each of the plurality of heat transfer elements are in contact with the container.

17. The geothermal energy exchanger and battery apparatus of claim 1, wherein the one or more plate baffles comprises a first plate baffle and a second plate baffle, wherein one or more first protrusion free locations of the first plate baffle are arranged staggered from one or more second protrusion free locations of the second plate baffle in the interior of the container, wherein the first protrusion free locations of the first plate baffle and the second protrusion free location of the second plate baffle are configured to create a cork screw movement of the heat transfer fluid between the first plate baffle and the second plate baffle.

18. The geothermal energy exchanger and battery container of claim 2 further comprises one or more heat transfer connection elements, wherein the one or more heat transfer connection elements operatively couple distal portions of at least two of the plurality of heat transfer elements, wherein the distal portions of the one or more heat transfer elements are located opposite to and extend away from the container housing.

19. The geothermal energy exchanger and battery container of claim 1, further comprising:
- an inlet operatively coupled to the container housing configured to receive the heat transfer fluid;
- an outlet operatively coupled to the container housing configured to dispense the heat transfer fluid; and
- a nozzle operatively coupled to the inlet, wherein the nozzle is configured to create turbulent flow in the container.

20. The geothermal energy exchanger and battery container of claim 5, wherein:
- the mass heat transfer elements comprise a first mass heat transfer element and a second mass heat transfer element positioned on the exterior of the container housing;
- each of the first mass heat transfer element and the second mass heat transfer element comprise a proximal portion connected to the outer surface of the container housing and an opposite distal portion located away from the container housing;
- each of the distal portions of the first mass heat transfer element and the second mass heat transfer element comprise an open eyelet; and
- the container further comprises a heat transfer connection element operatively coupled to the distal portions of the first mass heat transfer element and the second mass heat transfer element, wherein the heat transfer connection element is threaded through the open eyelets of the first mass heat transfer element and the second mass heat transfer element.

\* \* \* \* \*